(12) United States Patent
Kikuta et al.

(10) Patent No.: US 11,405,509 B2
(45) Date of Patent: Aug. 2, 2022

(54) IMAGE PROCESSING APPARATUS AND METHOD EVALUATING PRINT QUALITY BASED ON DENSITY DIFFERENCE DATA

(71) Applicant: CANON KABUSHIKI KAISHA, Tokyo (JP)

(72) Inventors: Kyohei Kikuta, Tokyo (JP); Kosei Takahashi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/174,695

(22) Filed: Feb. 12, 2021

(65) Prior Publication Data

US 2021/0266422 A1 Aug. 26, 2021

(30) Foreign Application Priority Data

Feb. 26, 2020 (JP) .............................. JP2020-030845

(51) Int. Cl.
*H04N 1/00* (2006.01)
*G06T 7/00* (2017.01)
*H04N 1/407* (2006.01)

(52) U.S. Cl.
CPC ....... *H04N 1/00005* (2013.01); *G06T 7/0002* (2013.01); *H04N 1/0005* (2013.01); *H04N 1/00015* (2013.01); *H04N 1/00034* (2013.01); *H04N 1/00063* (2013.01); *H04N 1/00076* (2013.01); *H04N 1/4072* (2013.01); *G06T 2207/20224* (2013.01); *G06T 2207/30144* (2013.01); *G06T 2207/30168* (2013.01); *H04N 2201/0082* (2013.01)

(58) Field of Classification Search
CPC .... H04N 1/4072; H04N 1/233; H04N 1/2346; H04N 1/2376; H04N 1/2392; H04N 1/00002–00092; G06K 15/027; G06T 7/0002; G06T 2207/30168
See application file for complete search history.

(56) References Cited

U.S. PATENT DOCUMENTS 10,657,635 B2 * 5/2020 Kaneko ..................... G06T 7/13

FOREIGN PATENT DOCUMENTS

| EP | 0332706 A1 | 9/1989 |
| EP | 0533305 A2 | 3/1993 |
| EP | 3509286 A1 | 7/2019 |
| JP | 2015178970 A | 10/2015 |

OTHER PUBLICATIONS

Extended European search report issued in European Appln. No. 21155392.0 dated Jun. 9, 2021.

* cited by examiner

*Primary Examiner* — Scott A Rogers
(74) *Attorney, Agent, or Firm* — Rossi, Kimms & McDowell LLP

(57) ABSTRACT

There is provided with an information processing apparatus. A first obtaining unit obtains data of a reference image indicating a target of printing output to be performed by a printing apparatus. A second obtaining unit obtains data of an image printed by the printing apparatus. A correcting unit corrects a local image density difference or the reference image based on a global image density difference between the reference image and the printed image. An evaluating unit evaluates quality of the printed image based on the local image density difference between the corrected reference image and the printed image.

2 Claims, 14 Drawing Sheets

IMAGE PROCESSING APPARATUS AND METHOD EVALUATING PRINT QUALITY BASED ON DENSITY DIFFERENCE DATA

BACKGROUND OF THE INVENTION

Field of the Invention

The present invention relates to an information processing apparatus and an information processing method.

Description of the Related Art

In the printing industry, an inspection (product inspection) work is conventionally performed after printing, in order to ensure that the printed deliverable to be delivered to the customer has no defect and has no problem in quality. For example, there is a technique by which reference image data (to be called reference data hereinafter) of a printed deliverable as a good product is formed in advance, and inspection is automatically performed by comparing printed image data (to be called print data hereinafter) of a printed product to be inspected with the reference data.

In an electrophotographic printing apparatus, the image density or coloring of an output deliverable of the same input data sometimes changes in accordance with the status of the printing apparatus during the output operation. Japanese Patent Laid-Open No. 2015-178970 discloses an inspection technique taking account of a case like this. That is, in Japanese Patent Laid-Open No. 2015-178970, if a change such as calibration occurs in a printing apparatus, a master image for performing defect inspection on a read image is regenerated, and the read image is compared with the master image.

SUMMARY OF THE INVENTION

According to one embodiment of the present disclosure, an information processing apparatus comprises: a first obtaining unit configured to obtain data of a reference image indicating a target of printing output to be performed by a printing apparatus; a second obtaining unit configured to obtain data of an image printed by the printing apparatus; a correcting unit configured to correct a local image density difference or the reference image based on a global image density difference between the reference image and the printed image; and an evaluating unit configured to evaluate quality of the printed image based on the local image density difference between the corrected reference image and the printed image.

According to one embodiment of the present disclosure, an information processing apparatus comprises: a first obtaining unit configured to obtain data of a reference image indicating a target of printing output to be performed by a printing apparatus; a second obtaining unit configured to obtain data of an image printed by the printing apparatus; a correcting unit configured to correct a local image density difference between the reference image and the printed image based on a global image density difference between the reference image and the printed image; and an evaluating unit configured to evaluate quality of the printed image based on the corrected local image density difference.

According to one embodiment of the present disclosure, an information processing apparatus comprises: a first obtaining unit configured to obtain data of a reference image indicating a target of printing output to be performed by a printing apparatus; a second obtaining unit configured to obtain data of a printed image by reading an image printed by the printing apparatus; a generating unit configured to generate difference data by using one of a first image density difference between a pixel in a position of a pixel of interest in the reference image and a pixel in the position of a pixel of interest in the printed image, and a third image density difference obtained by subtracting, from the first image density difference, a second image density difference between a region containing a pixel in the position of a pixel of interest in the reference image and a region containing a pixel in the position of a pixel of interest in the printed image, as a difference corresponding to a pixel in the position of a pixel of interest; and an evaluating unit configured to evaluate quality of the printed image based on the difference data.

According to one embodiment of the present disclosure, an information processing method comprises: obtaining data of a reference image indicating a target of printing output to be performed by a printing apparatus; obtaining data of an image printed by the printing apparatus; correcting a local image density difference or the reference image based on a global image density difference between the reference image and the printed image; and evaluating quality of the printed image based on the local image density difference between the corrected reference image and the printed image.

According to one embodiment of the present disclosure, an information processing method comprises: obtaining data of a reference image indicating a target of printing output to be performed by a printing apparatus; obtaining data of a printed image obtained by the printing apparatus; correcting a local image density difference between the reference image and the printed image based on a global image density difference between the reference image and the printed image; and evaluating quality of the printed image based on the corrected local image density difference.

According to one embodiment of the present disclosure, an information processing method comprises: obtaining data of a reference image indicating a target of printing output to be performed by a printing apparatus; obtaining data of a printed image by reading an image printed by the printing apparatus; generating difference data by using one of a first image density difference between a pixel in a position of a pixel of interest in the reference image and a pixel in the position of a pixel of interest in the printed image, and a third image density difference obtained by subtracting, from the first image density difference, a second image density difference between a region containing a pixel in the position of a pixel of interest in the reference image and a region containing a pixel in the position of a pixel of interest in the printed image, as a difference corresponding to a pixel in the position of a pixel of interest; and evaluating quality of the printed image based on the difference data.

Further features of the present invention will become apparent from the following description of exemplary embodiments (with reference to the attached drawings).

DESCRIPTION OF THE EMBODIMENTS

Figure 1:
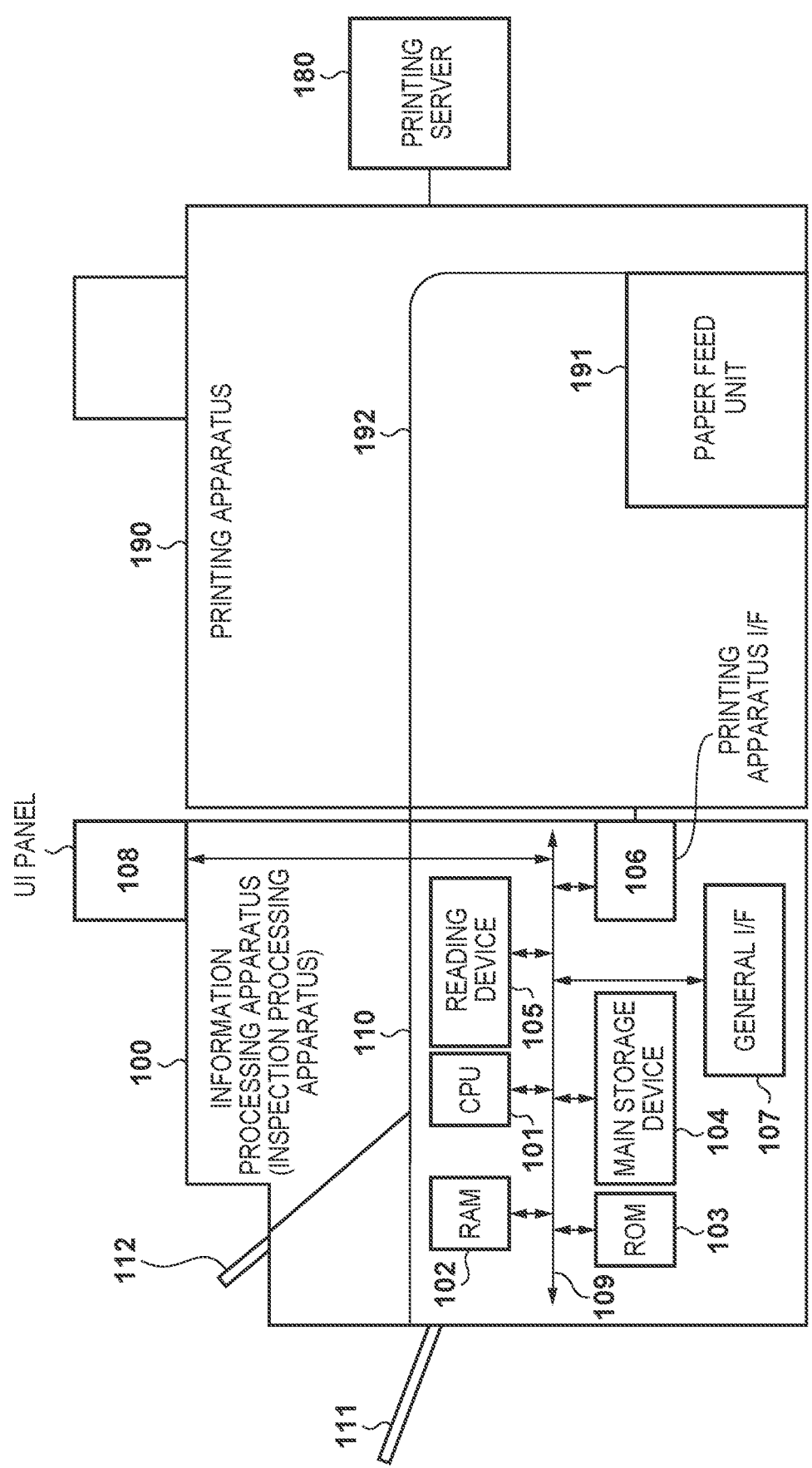
FIG. 1 is a view showing an example of the functional configuration of a printing system according to the first embodiment.

In Japanese Patent Laid-Open No. 2015-178970, the master image is regenerated only when a clear change such as calibration occurs in a printing apparatus. Accordingly, this technique cannot cope with an image density variation unaccompanied by a clear change, such as an image density variation with time, and hence cannot accurately inspect an output of the printing apparatus in some cases.

One embodiment of the present invention can provide processing for accurately inspecting an output of a printing apparatus even when no clear change occurs in the printing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

When comparing pixel values of a reference image (reference data) indicating the target of printing output with those of a printed image (print data) and evaluating the image quality (quality) of the print data, an information processing apparatus according to the first embodiment corrects the pixel values of the reference data based on a global image density difference between the reference data and the print data. As will be explained in detail later with reference to FIGS. 4 to 7, the information processing apparatus corrects pixel values by using an average pixel value in a local region, in corresponding comparison regions of the reference data and the print data, and detects a defect based on the corrected pixel values. This processing can reduce the influence of a global printing image density variation that occurs on the reference data with time, and hence can perform more appropriate defect detection.

Figure 6:
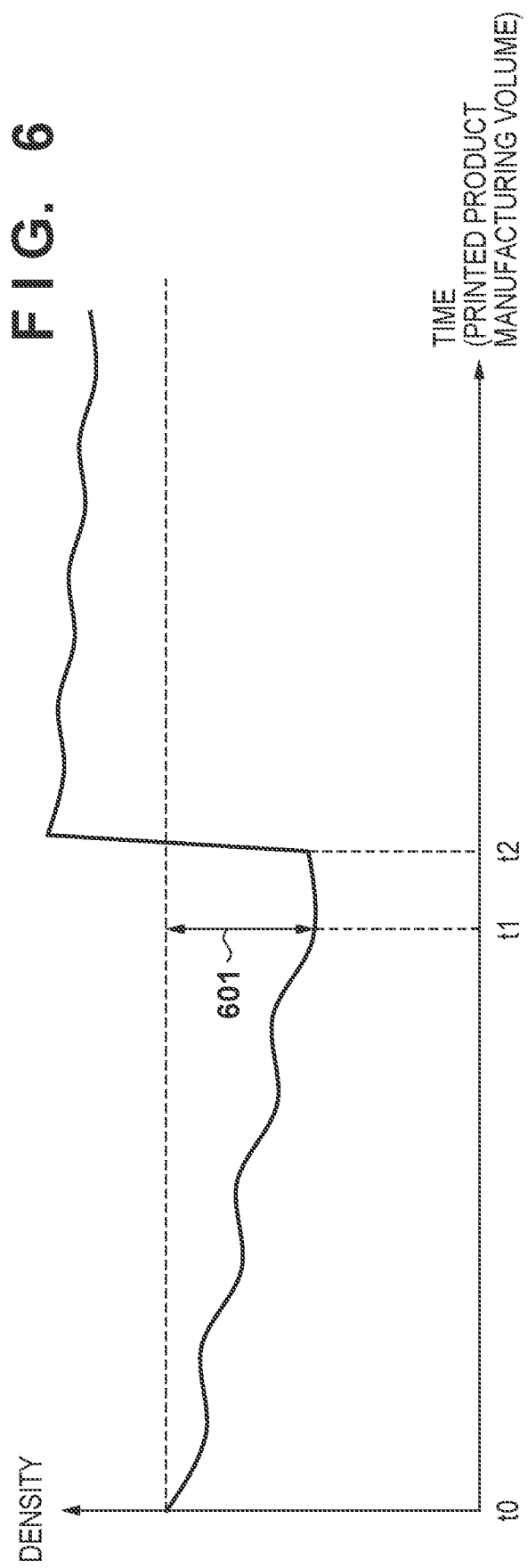
FIG. 6 is a view showing an example of a change in printing density with time of a printing apparatus according to the first embodiment.

Note that the global image density variation (image density difference) is the image density difference of an arbitrary toner color with respect to the reference data, which uniformly occurs in the whole print data in accordance with the passage of time, as shown in, for example, FIG. 6. FIG. 6 is a graph showing the output image density difference with respect to a predetermined pixel value of a given toner color as a function of the elapsed time, in an electrophotographic printing apparatus. In the electrophotographic printing apparatus, the image density or coloring of an output printed product sometimes changes in accordance with the status during the output operation, even when the same input data is given. In this example shown in FIG. 6, toner is replenished inside the printing apparatus at time t2, and the printing image density rises. Details of FIG. 6 will be explained later.

FIG. 1 is a block diagram showing an example of the configuration of a printing system including an information processing apparatus according to the first embodiment. The printing system including an information processing apparatus 100 according to this embodiment includes a printing server 180 and a printing apparatus 190. The printing server 180 generates a current print job to be printed, and inputs the print job to the printing apparatus 190. Based on the input print job, the printing apparatus 190 forms an image on a printing medium set in a paper feed unit 191. The printing medium on which an image is formed is not particularly limited, and the following explanation will be made by assuming that paper (a printing sheet) is used as the printing medium. The user sets a printing sheet in the paper feed unit 191 of the printing apparatus in advance. When a print job is input, the printing apparatus 190 conveys the printing sheet to the information processing apparatus 100 along a conveyance path 192 while forming an image on the obverse surface or on the both surfaces.

The information processing apparatus 100 conveys the paper, that is, the printed product conveyed through the conveyance path 192 by the printing apparatus 190, by a conveyance path 110 connected from the conveyance path 192, and at the same time performs an inspection process on the printed product in order to detect a defect with respect to reference data, and supplies the printed product to a tray corresponding to the inspection result. The information processing apparatus 100 incorporates a CPU 101, a RAM 102, a ROM 103, a main storage device 104, a reading device 105, a printing apparatus interface (I/F) 106, a general I/F 107, a user interface (UI) panel 108, and a main bus 109. The information processing apparatus 100 also includes the printed product conveyance path 110 connected to the conveyance path 192, an output tray 111 for a printed deliverable having passed the inspection process, and an output tray 112 for a printed product having failed the inspection because a defect is found. In the following explanation, a printed product having passed the inspection performed by the information processing apparatus 100 because no defect is detected will be called a printed deliverable.

The CPU 101 is a processor for comprehensively controlling the individual units of the information processing apparatus 100. The RAM 102 functions as a main memory and a work area of the CPU 101. The ROM 103 stores programs to be executed by the CPU 101. The main storage device 104 stores applications to be executed by the CPU 101, and data to be used in image processing. The reading device 105 is a scanner or the like, and can obtain image data by reading, on the conveyance path 110, one surface or the both surfaces of a printed product supplied from the printing apparatus. The printing I/F 106 is connected to the printing apparatus 190, can synchronize the printed product processing timings with the printing apparatus 190, and can communicate their operation statuses to each other. The general I/F 107 is a serial bus interface such as a USB or IEEE1394, and is used by the user to, for example, obtain and take out data such as a log. The UI panel 108 is a liquid crystal display or the like, functions as a UI of the information processing apparatus 100, and notifies the user of the current status and setting by displaying them. The UI panel 108 may also be a touch panel and can include input buttons, in order to accept instructions from the user. The main bus 109 connects the individual units of the information processing apparatus 100. The CPU 101 can operate each internal part of the information processing apparatus 100 or the printing system. For example, the CPU 101 can synchronously operate the conveyance paths and selectively convey a printed product to the output tray 111 for a qualified product or the output tray 112 for a disqualified product in accordance with the inspection result.

Figure 2:
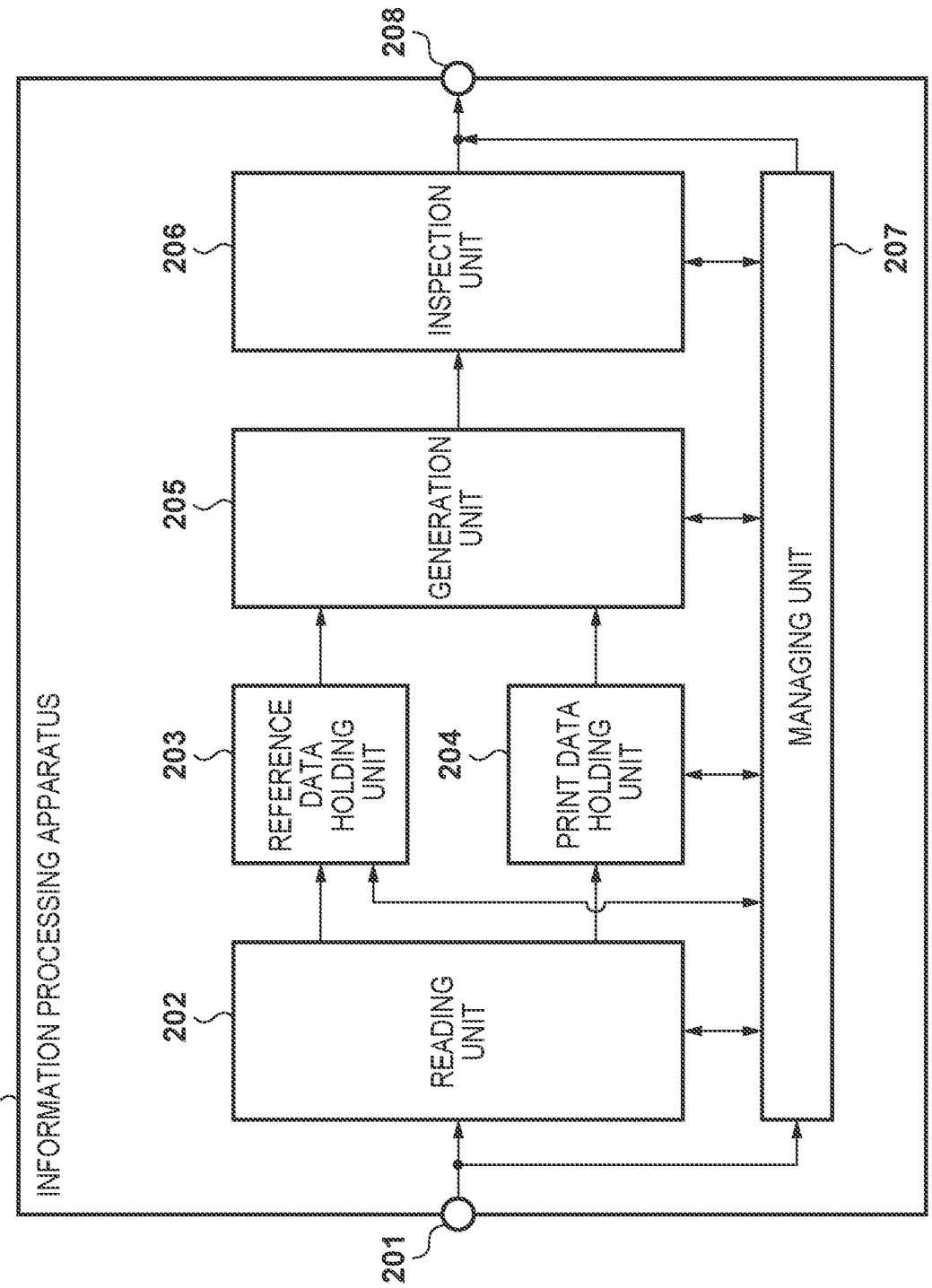
FIG. 2 is a view showing an example of the functional configuration of an information processing apparatus according to the first embodiment.

FIG. 2 is a block diagram showing an example of the functional configuration of the information processing apparatus 100 shown in FIG. 1. The information processing apparatus 100 includes an input terminal 201, a reading unit 202, a reference data holding unit 203, a print data holding unit 204, a generation unit 205, an inspection unit 206, a managing unit 207, and an output terminal 208. The input terminal 201 receives a control signal as an input to the information processing apparatus 100, which is transmitted as needed or in synchronization with the output of a printed product from the printing apparatus 190. The output terminal 208 outputs a control signal for an internal operation of the printing system based on the result of inspection performed by the inspection unit 206. When the control signal is input to the input terminal 201, the reading unit 202 obtains image data of a printed product on the conveyance path 110. This image data obtained by the reading unit 202 is classified into reference data or print data in accordance with an image read by the reading device 105. The reference data is stored in the reference data holding unit 203, and the print data is stored in the print data holding unit 204. The generation unit 205 compares the reference data and the print data, and generates difference data as the comparison result. This difference data generated by the generation unit 205 will be described later with reference to FIGS. 4 to 7. Based on the difference data generated by the generation unit 205, the inspection unit 206 determines whether the printed product has a defect. Then, based on the determination result, the inspection unit 206 outputs a control signal for an internal driving unit of the printing system via the output terminal 208. The managing unit 207 exchanges information with each functional unit, collects and manages operation information such as the number of currently processed images and the presence/absence of an error, and outputs the result as a log or transmits a control signal to the whole printing system as needed.

Figure 3:
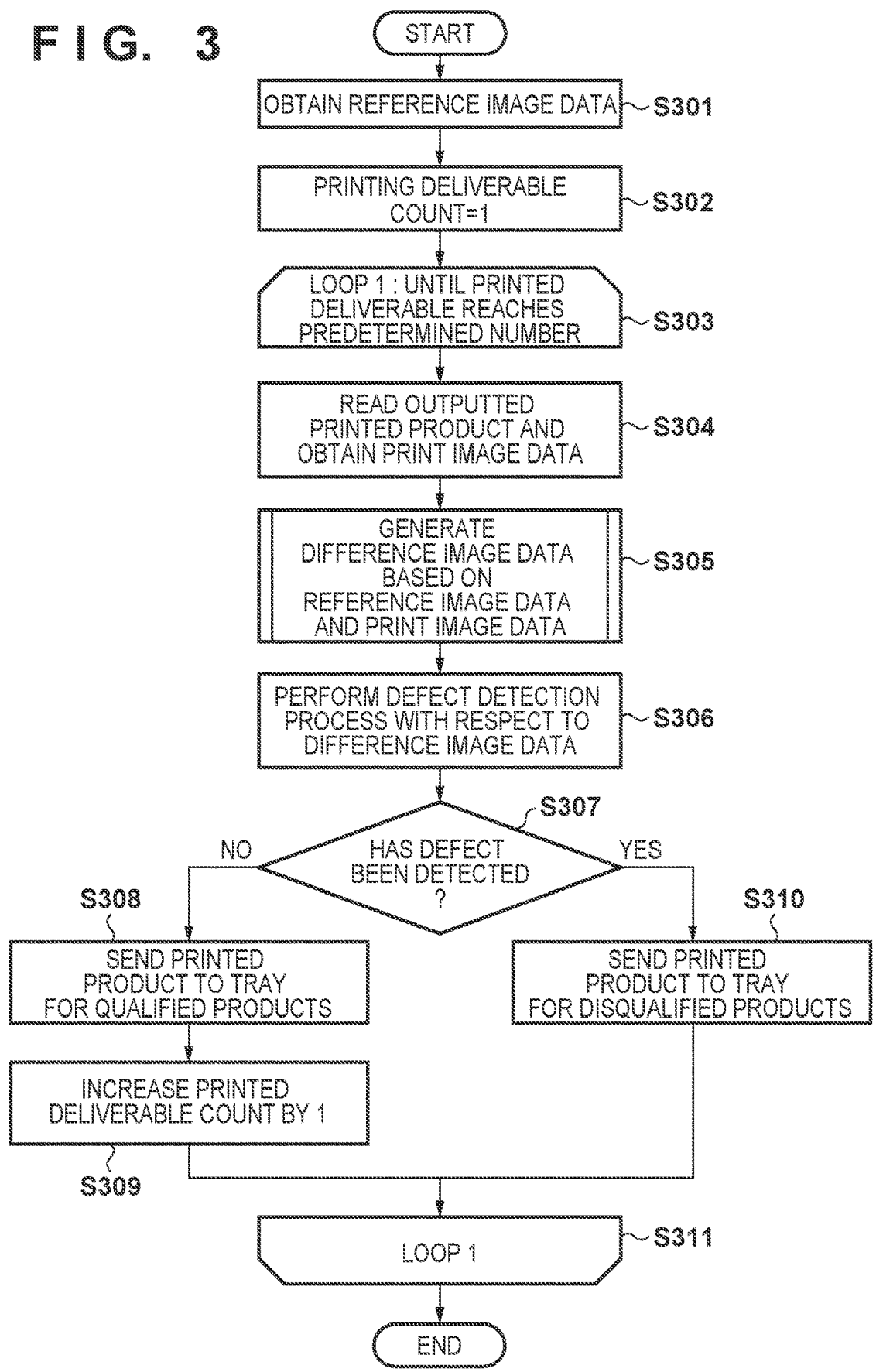
FIG. 3 is a flowchart showing an example of the processing of an information processing method according to the first embodiment.

FIG. 3 is a flowchart showing an example of the procedure of a process to be performed by the information processing apparatus 100 according to this embodiment. The CPU 101 reads out a program corresponding to this flowchart shown in FIG. 3 and executes the program. In the following explanation, each step will be represented by attaching S before the reference number.

In S301, the information processing apparatus 100 obtains reference data. For this purpose, the user prints a small amount of printed products by the printing apparatus, and selects good products that have no defects and can be delivered as deliverables, from the printed products. Then, the reading unit 202 obtains image data by reading the selected good printed products. This image data of the good products is classified as reference data and stored in the reference data holding unit. The format of the reference data is not particularly limited, and it is assumed in the following explanation that the reference data is obtained by an RGB 8-bit format (that is, the reference data is represented by a three-dimensional vector array having R, G, and B channels as elements). In this example, visual inspection is necessary to select good products in S301, but automatic inspection processing can be performed in the subsequent process as will be explained below. In S302, the managing unit 207 sets the internal count indicating the number of printed deliverables to 1. This count is used until the printed deliverables reach a predetermined number in a loop in S303 (to be described below).

In S303 to S311, the printing apparatus 190 performs a production operation, and classifies the printed products into printed deliverables and disqualified products. The information processing apparatus 100 repeats the processes in S303 to S311 on printed products sequentially supplied from the printing apparatus 190, based on an input control signal synchronized with the printing apparatus 190, until the printed deliverables reach the predetermined number. In S304, the reading unit 202 reads the printed product output from the printing apparatus 190, and generates print data as an image to be inspected. This print data is stored in the print data holding unit 204. The format of the print data is not particularly limited, and is the same format as the reference data, that is, the RGB 8-bit format in this embodiment.

In S305, based on the reference data obtained in S301 and the print data obtained in S304, the generation unit 205 obtains difference data D indicating the difference between the reference data as a good product and the print data by taking account of a global image density difference between the images. Accordingly, the generation unit 205 corrects the pixel values of the reference data based on the global image density difference between the images. Then, the difference data D can be obtained by calculating the difference from the corrected image data. Assume that the difference data is obtained in S305 as image data having the same size as that of the reference data and the print data. Details of the obtaining process will be described later with reference to FIG. 4.

In S306, the inspection unit 206 performs a printed product defect detection process on the difference data D. The difference data D records a value indicating the difference between images for each pixel. Therefore, if there is a region satisfying a predetermined condition on the difference data D, the inspection unit 206 can detect this region as a region indicating a defect of the printed product. The region existing on the difference data D and indicating a defect of the printed product can be a pixel for which the value of the difference exceeds a predetermined value, a region where the pixel region like this exceeds a predetermined area, or a region where the pixel region like this forms a predetermined shape such as a line. These regions can be detected by using a well-known technique, for example, an image filtering process, or a process of calculating the sum of pixel values in a row or a column corresponding to the line direction. If a region indicating a defect as described above is detected, the inspection unit 206 can regard the corresponding print data as disqualified data. On the contrary, if the pixel values are 0 or sufficiently small over the entire region of the difference data D, that is, if there is no difference between the reference data and the print data, it is possible to regard a printed product corresponding to the print data as a good product, and classify the printed product as a printed deliverable.

In S307, the inspection unit 206 determines whether a defect is detected by the defect detection process in S306. If no defect is detected, the result is "qualified", and the process advances to S308. In S308, the inspection unit 206 outputs a control signal to the printing system so as to send the printed product to the tray 111 for printed deliverables. In S309, the managing unit 207 increments the printed deliverable count by 1, and advances the process to S311. If the inspection unit 206 determines in S307 that a defect is detected, the result of inspection is "disqualified", and the process advances to S310. In S310, the inspection unit 206 outputs a control signal to the printing system so as to send the printed product to the tray 112 for disqualified products, and advances the process to S311. Note that the information processing apparatus 100 can also include a plurality of trays 112 for disqualified products, and selectively send printed products to these trays in accordance with the types and degrees of detected defects. In S311, the inspection unit 206 determines whether the count of printed deliverables has reached a predetermined number. If the count has reached the predetermined number, the inspection unit 206 terminates the process. If not, the inspection unit 206 returns the process to S303. In this process, it is possible to automatically classify printed products into qualified products and disqualified products, and obtain a predetermined number of deliverables for which a predetermined quality is secured, by adopting the qualified products as final deliverables.

Figure 4:
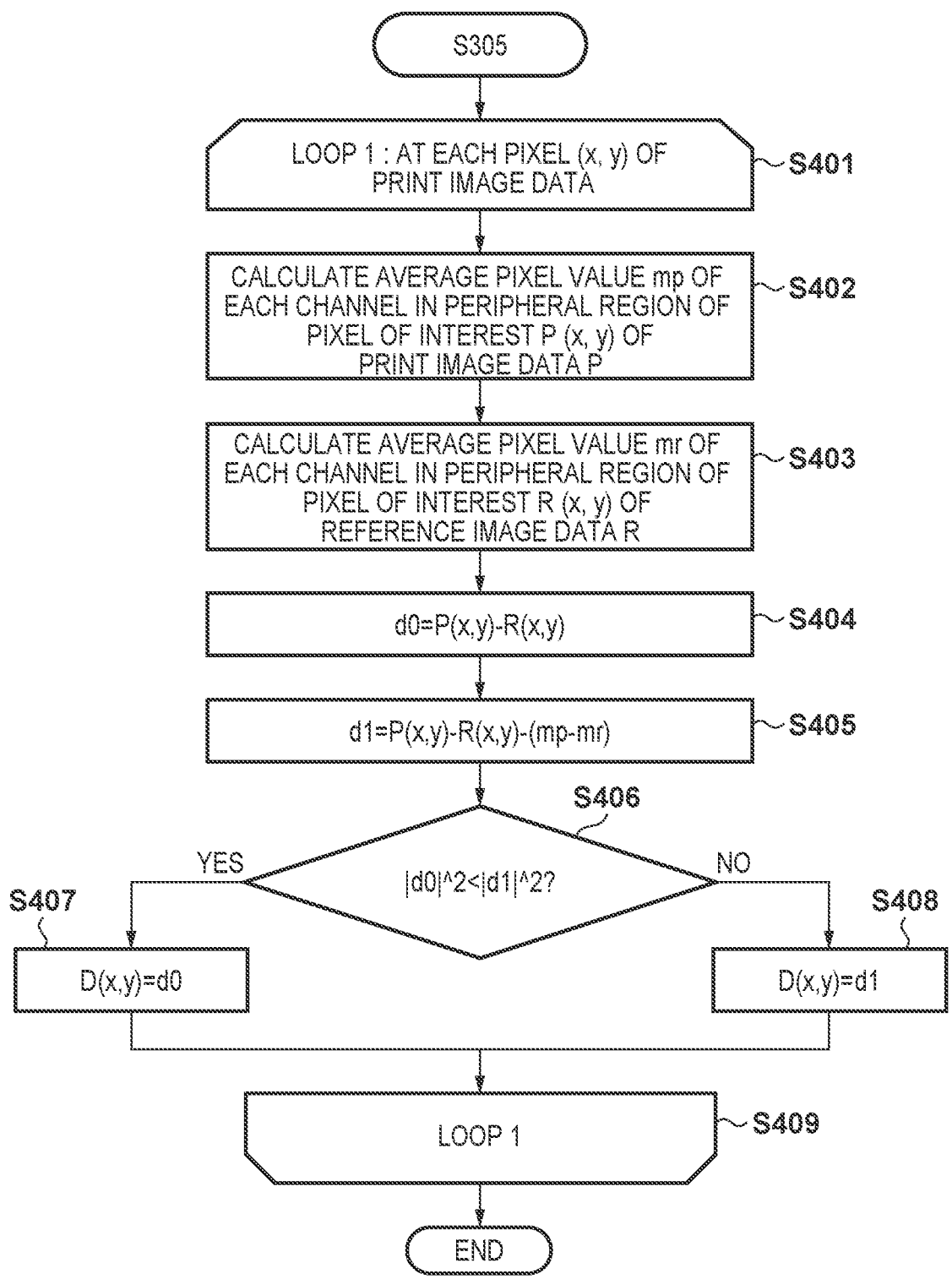
FIG. 4 is a flowchart showing an example of a difference generation process according to the first embodiment.

The difference data generation process in S305 will now be explained with reference to FIG. 4. FIG. 4 is a flowchart showing an example of the procedure of a process by which the generation unit 205 generates the difference data D from print data P and reference data R. For the sake of explanation, it is assumed that the print data P and the reference data R have the same size, and neither positional deviation nor rotational deviation occurs during scanning. Assume also that a specific pixel position (x, y) corresponds to the same position on images.

Figure 5:
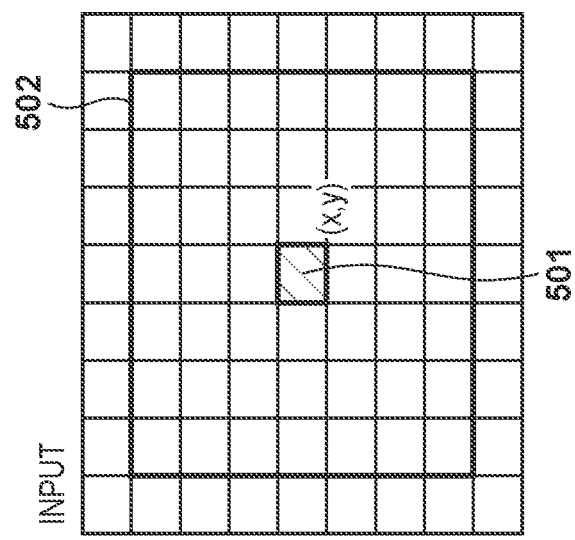
FIG. 5 is a view for explaining processing to be performed by a generation unit according to the first embodiment.

In S401, the generation unit 205 repeats processes in S401 to S409 by using a pixel P(x, y) of the print data P as a pixel of interest. In S402, the generation unit 205 calculates a mean value mp of each of R, G, and B channels in the peripheral region of the pixel P(x, y) of interest of the print data P. In this case, mp is a three-dimensional vector, and each element corresponds to each of the R, G, and B channels. FIG. 5 is a view for explaining the relationship between the pixel P(x, y) of interest and its peripheral region for obtaining the mean value mp. In FIG. 5, a pixel 501 is the pixel P(x, y) of interest, and a 7×7 region 502 centered around the pixel of interest is a region (mean value obtaining region) for obtaining the mean value. Note that the mean value obtaining region has 7×7 pixels for the sake of explanation, but the region is not particularly limited to this value, and it is also possible to use a partial region having an appropriate desired size.

In S403, the generation unit 205 calculates a mean value mr of each of the R, G, and B channels in the peripheral region of a pixel R(x, y) of interest of the reference data R, in the same manner as in S402. Like mp, mr is a three-dimensional vector corresponding to each of the R, G, and B channels. In S404, the generation unit 205 calculates d0 as a pixel value candidate in the position (x, y) of the difference data D in accordance with equation (1) below. That is, d0 is a simple difference between pixel values in the corresponding positions of the print data and the reference data, and is a three-dimensional vector having elements corresponding to the R, G, and B channels.

$$d0 = P(x,y) - R(x,y) \quad (1)$$

Then, in S405, the generation unit 205 calculates d1 as a pixel value candidate different from d0 in the position (x, y) of the difference data in accordance with equation (2) below. That is, d1 is a pixel value difference between the print data and the reference data corrected by using mp−mr as an offset for matching the mean values in the peripheral regions, in the corresponding positions of the print data P and the reference data R. More specifically, since the mean values of the pixel values in the peripheral regions of P(x, y) and R(x, y)+(mp−mr) match, a difference can be calculated while canceling the global image density difference between images. The significance of this process will be described in detail later with reference to FIGS. 6 and 7. Like d0, d1 is also a three-dimensional vector having elements corresponding to the R, G, and B channels.

$$d1 = P(x,y) - R(x,y) - (mp - mr) \quad (2)$$

In S406, the generation unit 205 calculates the squared norms of d0 and d1, and determines which is smaller. If the squared norm of do is smaller, the process advances to S407. If not, the process advances to S408. In S407 or S408, the generation unit 205 adopts one of d0 and d1, which is found to have a smaller squared norm in S406, as a pixel value D(x, y) in the position (x, y) of the difference data D, and advances the process to S409. In S409, the generation unit 205 determines whether the processes in S401 to S408 have been performed on all pixel positions of the print data P and the reference data R. The generation unit 205 terminates the process if YES in S409, and returns the process to S401 if not.

By repetitively performing S401 to S409 described above on all pixel positions of the print data P and the reference data R, all pixel values of the difference data D are determined, and a difference image data D is obtained. As a consequence, the difference data D has the same size and the same number of channels as those of the print data P and the reference data R, and the pixel position (x, y) corresponds to the same position in these image data.

In this processing as described above, it is possible to correct the pixel values of the reference data based on the global image density difference between the reference data and the print data, and obtain the difference data D based on the corrected pixel values. The significance of performing the correction as described will be explained below. Referring to FIG. 6 again, an image density variation occurs in a direction in which the image density gradually decreases, from time t0 at which outputting of the printed product is started to time t2 via time t1. Also, as described previously, toner replenishment occurs inside the printing apparatus at time t2, so the image density of printing starts rising. These image density variations often occur on the whole output printed image.

If the image density variation caused by the characteristics of the printing apparatus as described above is excessive, this variation can visually be confirmed even on the printed product, so there is the possibility that the printed product has a defect. However, unlike when an image density difference exists in only a local region in one image, if an image density difference from the reference data is uniformly produced in the whole print data, the difference is visually inconspicuous, so this case is sometimes regarded as being permissible. The purpose of inspecting a printed product is to ensure that the printed deliverable has no problem in quality. However, if the standards of the inspection are made excessively strict by giving priority to the quality, the number of disqualified products increases, and this may decrease the productivity and give bad influence on the delivery date and the cost. Accordingly, it is not appropriate to simply set excessively strict inspection standards for every case, and it is desirable to properly set the inspection standards case by case.

A case in which an inconspicuous image density difference is permitted as described above will be explained below. When the reference data is obtained at time t0, the printing image density at time t1 shifts by an amount indicated by a width 601 even when the same pixel value is input. This image density difference appears and is recorded as a read pixel value difference in the difference data D generated by the generation unit 205. If, for such difference data D, the defect detection process that is based on the difference data D as in S306 but uses only d0 is performed, that is, if the inspection without taking account of the existence of a permissible uniform image density difference is performed, the accuracy of the inspection may decrease or a wrong result may be detected because of the density shift, which actually is inconspicuous and permissible uniform image density difference. From this viewpoint, the inspection unit 206 according to this embodiment corrects the reference data based on the distribution of pixel values in a local region, in order to generate the difference data D by taking account of a uniform image density difference as described above. That is, a correction where $d1=P(x, y)-R(x, y)-(mp-mr)$ as described above is performed in this case. The difference d1 is obtained by subtracting the image density difference between two images P and R, calculated as the mean value difference (mp−mr), from d0. Or, as can be obvious from deformation $d1=(P(x, y)-mp)-(R(x, y)-mr)$, it is also possible to interpret that the difference is calculated after the mean values of the print data P and the reference R are matched. In either interpretation, the inspection unit 206 according to this embodiment can remove the permissible image density difference from the difference data D by calculating d1. This makes it possible to perform inspection by reducing the influence of the global image density difference.

Figure 7:
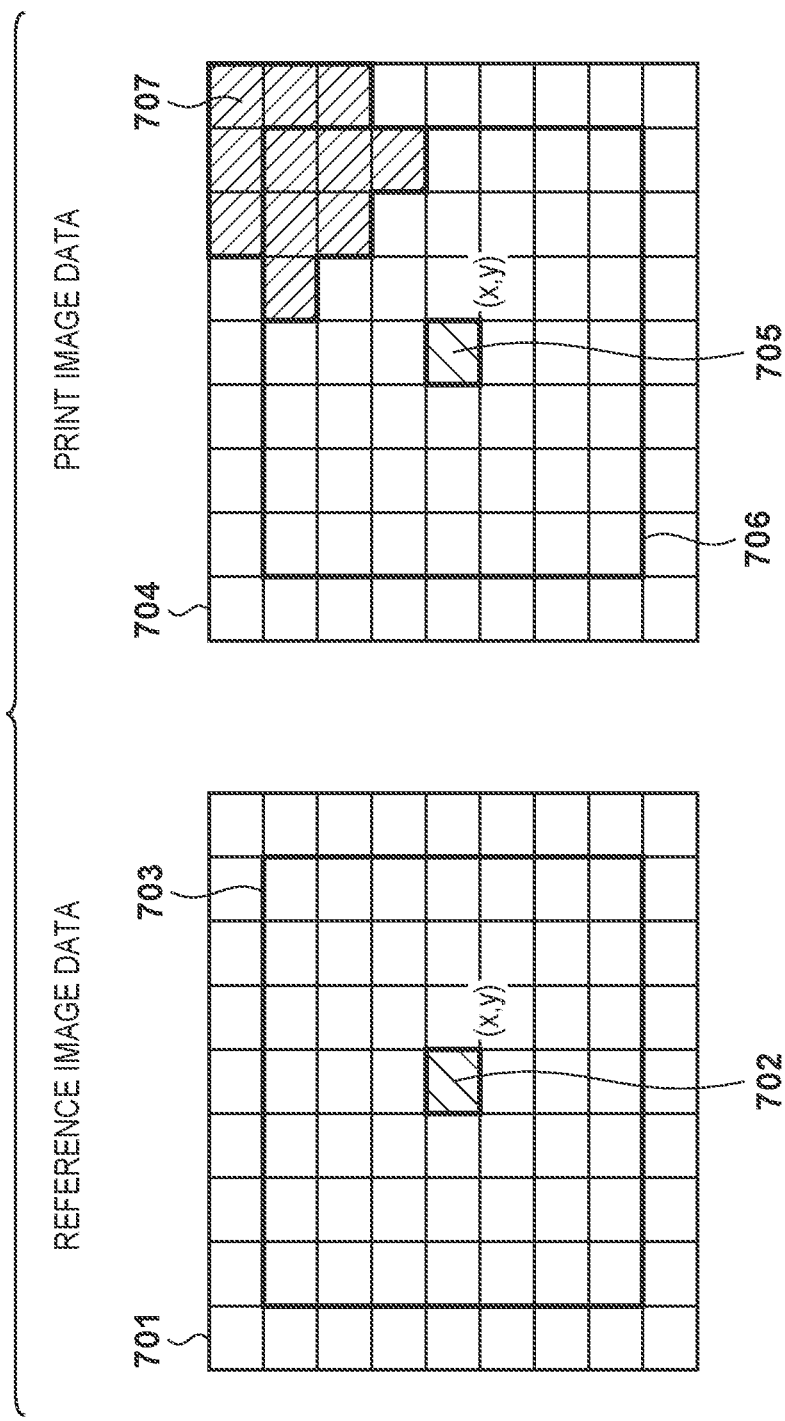
FIG. 7 is a view for explaining the significance of the processing to be performed by the generation unit according to the first embodiment.

In some cases, however, the inspection accuracy decreases instead by using d1 in the calculation of the difference data D. A case like this will be explained below with reference to FIG. 7. FIG. 7 is a view showing reference data 701 around a given pixel (x, y) of interest and print data 704 in the corresponding position. The reference data 701 contains a pixel 702 of interest and a mean value obtaining region 703. The print data 704 contains a pixel 705 of interest and a mean value obtaining region 706. The print data 704 has a defect region 707 (a hatched portion) having pixel values largely different from those in the corresponding region of the reference data 701. For the sake of explanation, it is assumed that the pixel values in the corresponding pixel positions of the reference data and the print data are the same in regions except the defect region 707. That is, since the pixel values of the two pixels of interest in FIG. 7 are the same, the pixel value of the pixel (x, y) of interest in the difference data D to be used in defect detection is desirably 0 or a near-zero value by which no defect can be detected. While d0 is 0, however, mr and mp to be used when calculating d1 have different values corresponding to that portion of the defect region 707, which enters the mean value obtaining region 706. That is, according to the equation of d1, the pixel values are adjusted so as to cancel the difference between mr and mp. Consequently, the difference between 702 and 705 includes the difference of the defect region 707 and becomes a significant value, although there is no difference in regions except the defect region 707.

When taking this into consideration, if the calculated value d1 is used in a region where the defect region overlaps the mean value obtaining region, that is, in the peripheral portion of the defect region, the pixel value difference of the defect region is included into the calculation of d1 of the pixel of interest in the difference data D, and it results in an undesirable pixel value shift of the pixel of interest in the difference data D as if the defect region blurred and expanded. That is, the resolution and the accuracy substantially decrease. This can decrease the accuracy of the defect detection process in later S306.

As described above, therefore, the generation unit 205 according to this embodiment can adopt one of d1 and d0, which has a smaller squared norm, as the pixel value of each pixel of the difference data D when generating the difference data D. According to this processing, it is possible to reduce the influence of a visually inconspicuous global image density difference by adjusting the mean value, and at the same time prevent the difference of the defect region from being included in the difference of the pixel of interest in the peripheral portion of the defect region as described above. This improves the generation accuracy of the difference data, and can also contribute to improving the accuracy of the inspection itself and the productivity.

The generation unit 205 according to this embodiment generates the difference data by using each of the whole reference data and the whole print data, but the present invention is not limited to this. The generation unit 205 can partially generate the difference data by using a part of each of the reference data and the print data, and the subsequent inspection process can sequentially be performed on the partially generated data.

In the information processing apparatus 100 according to this embodiment, the generation unit 205 can calculate mr in S403 or reobtain mr used in the past processing, whenever new print data is processed. For example, when the reference data is generated once and remains unchanged for a predetermined period, the reference data holding unit 203 can store mr calculated from the reference data used in the past processing, and the generation unit 205 can read out the stored mr whenever performing processing.

In this embodiment, it is assumed that the print data P and the reference data R have the same size, and neither positional deviation nor rotational deviation occurs during scanning. In actual processing, however, deviations like these may occur during scanning. From this point of view, the information processing apparatus 100 can perform a process of correcting positional deviation and rotational deviation during scanning, on scanned print data. For example, after the print data is obtained (between S304 and S305), the information processing apparatus 100 performs a feature point extraction process on the reference data and the print data, thereby obtaining corresponding points of the two image data. Then, the information processing apparatus 100 may obtain a transformation formula (for example, affine transformation) that matches the obtained corresponding points, and correct the deviations by applying the formula. The feature point extraction process used herein is not particularly limited, and it is possible to use a well-known method such as SIFT, SURF, ORB, or AKAZE. In S404, the generation unit 205 can also obtain, for the pixel P(x, y) of interest, not only the difference from the pixel R(x, y) of interest on the reference data, but also the differences from each pixel in the peripheral region of R(x, y). In this case, the generation unit 205 can select a pixel that takes the minimum difference from P(x, y) from pixels in the peripheral region of R(x, y), and adopt the selected minimum difference as d0. That is, a point that minimizes the image density difference from P(x, y) can be obtained from the peripheral region of the pixel of interest as a corresponding point.

Furthermore, since a pixel value changes largely in the edge portion (area where pixel values sharply change in a few pixels like a black line on white background) of an image, even a slight deviation having a visually small influence (about one pixel deviation for example) may be calculated as a large difference in the calculation of the difference data. From this viewpoint, in S407 and S408 for determining the pixel value D(x, y) of the difference data, the generation unit 205 can determine a value obtained by multiplying d0 or d1 by a weighting factor taking account of the edge region, as the value of D(x, y). That is, it is possible to determine the pixel value D(x, y) by obtaining the edge component of an image by using an edge extraction filter, and then multiplying the difference d0 or d1 by the weighting factor such that the larger the edge component is, the more the weighting factor reduces the difference (the closer to 0 the weighting factor is). One example of this weighting factor is the reciprocal of the edge component. Note that the weighting component used herein can be a weighting component corresponding to the edge component as described above, and can also be a weighting component that is generated by obtaining the frequency characteristic of each region of an image. This frequency-characteristic-based weighting component reduces the difference more in a high-frequency region. Processing like this can prevent a value, which is larger than the visual influence, from being calculated as the difference data.

Second Embodiment

Figure 8:
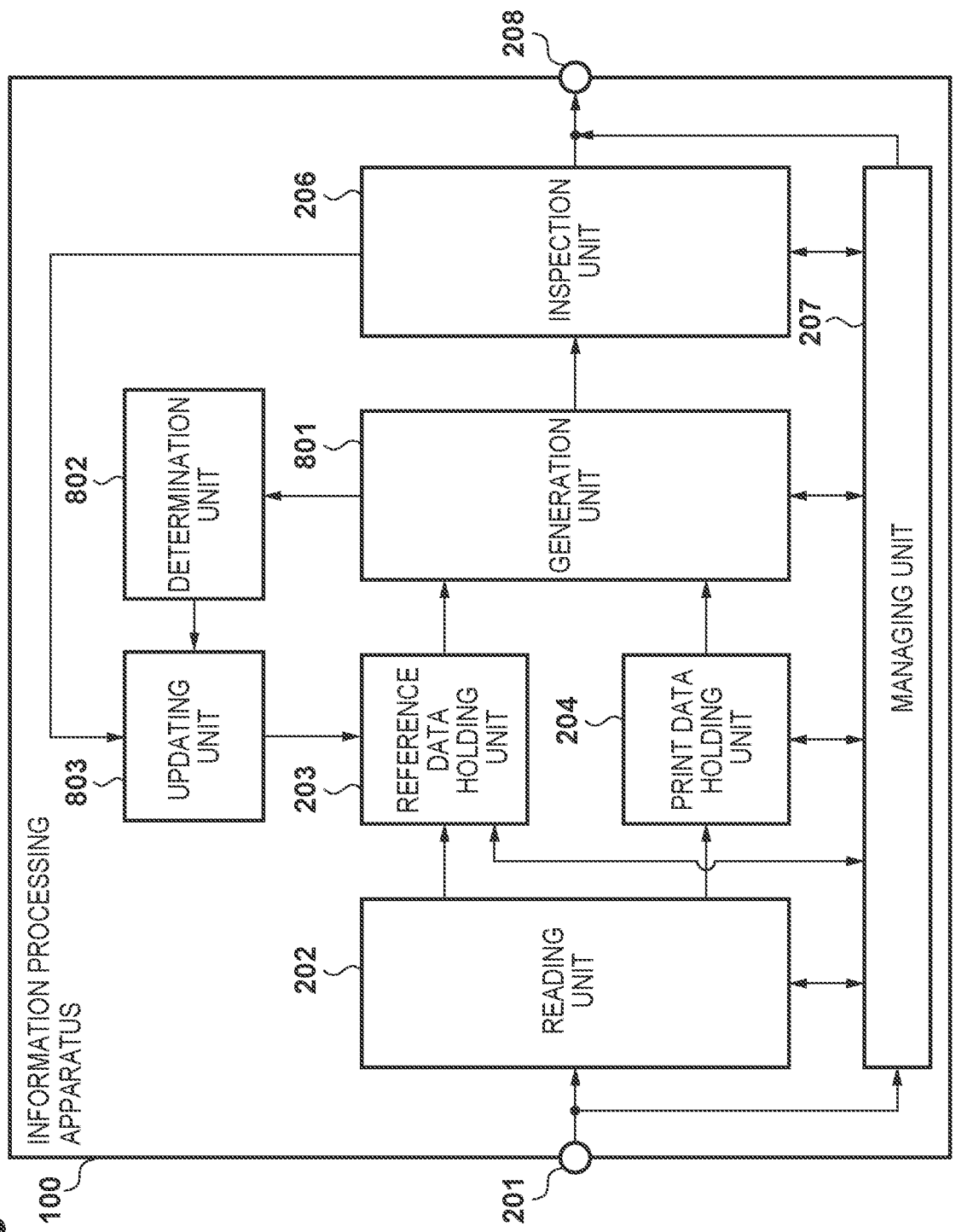
FIG. 8 is a view showing an example of the functional configuration of an information processing apparatus according to the second embodiment.

An information processing apparatus according to the second embodiment detects a global image density difference between reference data and print data, and corrects the reference data in accordance with the image density difference. In this embodiment, the reference data is updated to the print data. Therefore, an information processing apparatus 800 according to this embodiment has the same configuration as that of the information processing apparatus 100 of the first embodiment, except that the information processing apparatus 800 includes a determination unit 802, an updating unit 803, and a generation unit 801 instead of the generation unit 205, so a repetitive explanation will be omitted. FIG. 8 is a block diagram showing an example of the functional configuration of the information processing apparatus 800 according to this embodiment. A managing unit 207 can exchange information with the determination unit 802 and the updating unit 803, but FIG. 8 does not show this information exchange in order to avoid complexity.

The generation unit 801 generates difference data D in the same manner as the generation unit 205 according to the first embodiment, except that the generation unit 801 uses only d0 and does not use d1, and obtains information necessary to determine whether a global image density difference is produced between images, as will be described in detail later. Based on this information obtained by the generation unit 801, the determination unit 802 determines whether a global image density difference is produced between the reference data and the print data. If the determination unit 802 determines that a global image density difference is produced, the updating unit 803 corrects the reference data.

Figure 9:
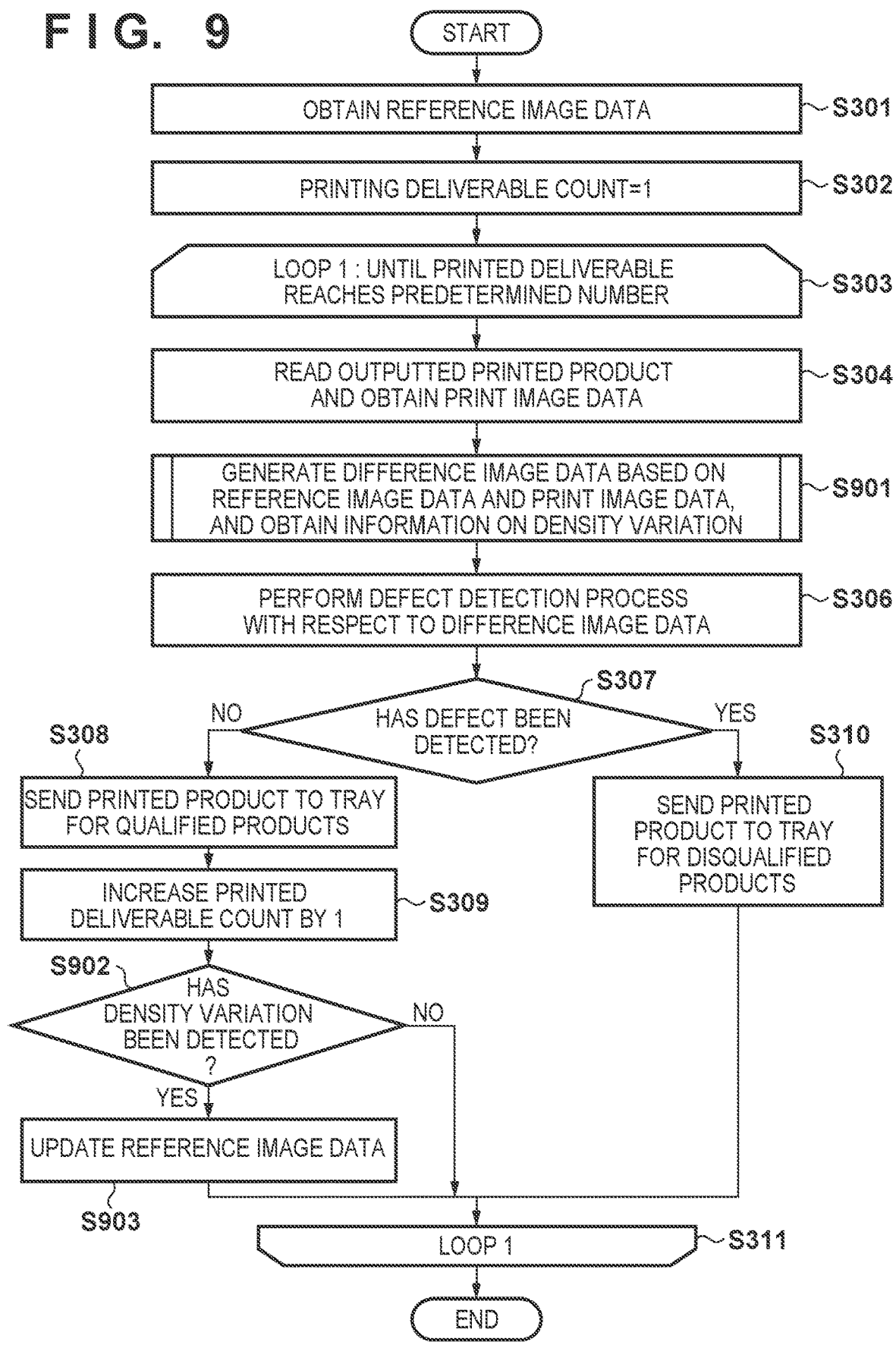
FIG. 9 is a flowchart showing an example of the processing of an information processing method according to the second embodiment.

Processing to be performed by the information processing apparatus 800 will be explained below with reference to FIG. 9. FIG. 9 is a flowchart showing an example of the procedure of the processing to be performed by the information processing apparatus 800 according to this embodiment. In this example shown in FIG. 9, the same processing as that shown in FIG. 3 is performed except that S901 is performed instead of S305, and S902 and S903 are processed subsequently to S309, so a repetitive explanation will be omitted.

In S901, based on reference data obtained in S301 and print data obtained in S304, the generation unit 801 obtains the difference data D by the same method as that in the first embodiment, except that d1 is not used and only d0 is used. The generation unit 801 also obtains information necessary to determine whether a global image density difference is produced between images. Then, the determination unit 802 determines whether a global image density difference is produced, based on the information obtained by the generation unit 801. The difference data generation process performed in S901 will be explained below with reference to FIG. 10.

Figure 10:
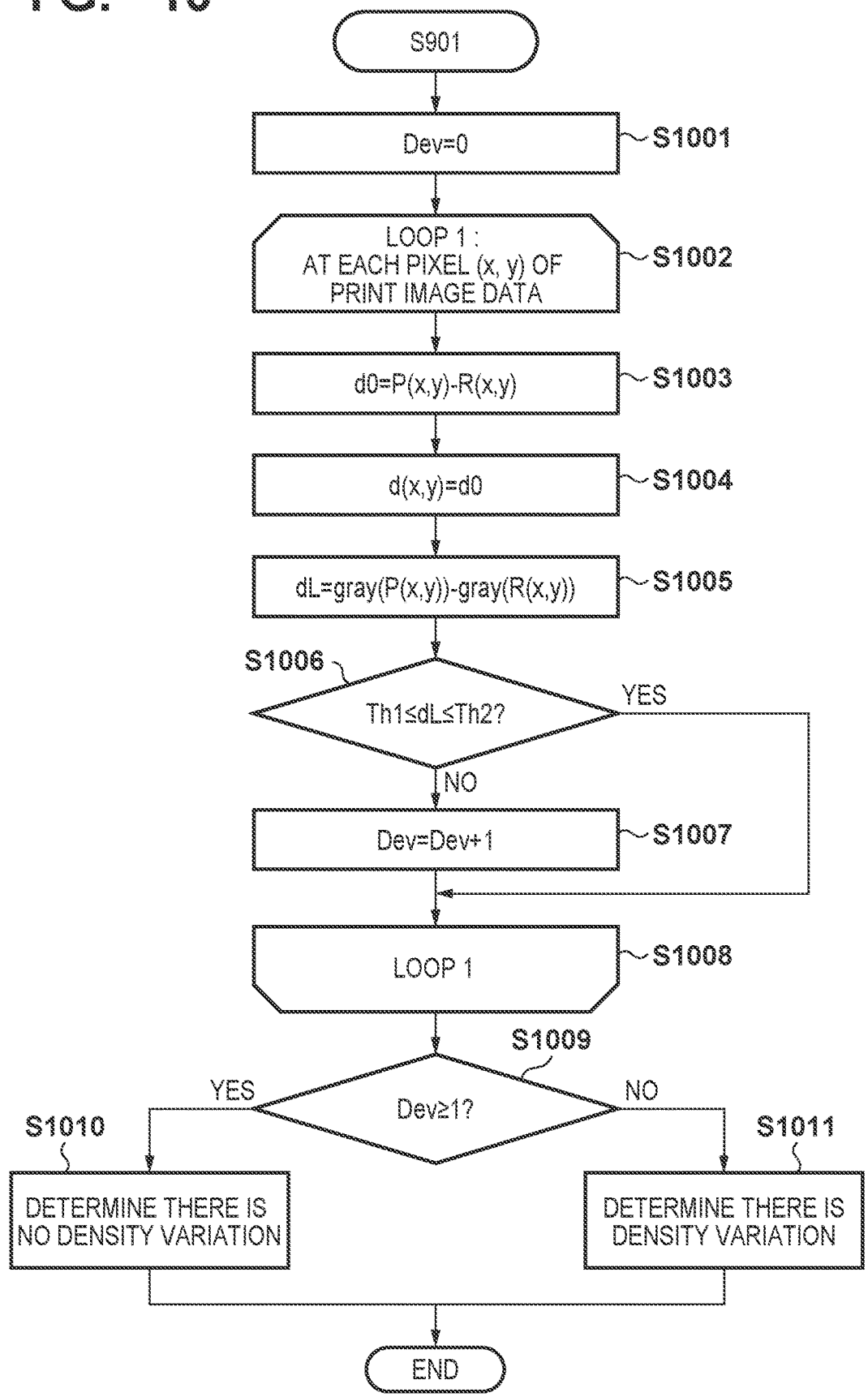
FIG. 10 is a flowchart showing an example of a determination process of the information processing apparatus according to the second embodiment.

FIG. 10 is a flowchart showing an example of the procedure of the process by which the information processing apparatus 800 according to the second embodiment generates the difference data D and determines, from the generated difference data, whether a global image density difference is produced between print data P and reference data R. For the sake of explanation, it is assumed that the print data P and the reference data R have the same size, and neither positional deviation nor rotational deviation occurs during scanning. Assume also that a pixel position (x, y) corresponds to identical positions in two images. In S1001, the generation unit 801 initializes a variable Dev to 0. The variable Dev represents the number of positions, among pixel positions in the difference data, where the difference between pixel values in the corresponding positions of the print data and the reference data satisfies a predetermined condition. In this example, the variable Dev is the number of pixels where the difference between pixel values in corresponding positions of the print data and the reference data falls outside a predetermined range by grayscale conversion, but the present invention is not particularly limited to this.

In S1002, the generation unit 801 repeats processes in S1002 to S1008 by using a pixel P(x, y) of the print data as a pixel of interest, until all pixels on the print data are processed. In S1003, the generation unit 801 calculates the difference d0 between pixel values in corresponding positions (x, y) of the print data P and the reference data R, in the same manner as in S404 of the first embodiment. In S1004, the generation unit 801 determines a pixel value in the pixel position (x, y) of the difference data D as the value of d0 calculated in S1003.

In S1005 to S1008, the generation unit 801 obtains information necessary to determine whether a global image density difference is produced between the images. First, in S1005, the generation unit 801 performs grayscaling (one-dimensional conversion) on the pixel values of P(x, y) and R(x, y). Then, the generation unit 801 calculates the difference between the grayscaled pixel values of P(x, y) and R(x, y) as a variable dL. FIG. 10 shows this grayscaling calculation as gray( ). The grayscaling process to be performed by the generation unit 801 is not particularly limited, so an arbitrary method can be used. For example, letting r(x, y), g(x, y), and b(x, y) be the values of the elements of R, G, and B channels in the pixel position (x, y), the generation unit 801 can calculate gray(x, y) by using weighted linear sum as indicated by equation (3) below:

$$gray(x,y)=0.21\times r(x,y)+0.72\times g(x,y)+0.072\times b(x,y) \quad (3)$$

The generation unit 801 can also calculate gray(x, y) by applying a conversion function for converting the luminance, the brightness, or the image density (optical density) from the color space of the image obtained by a reading unit 202 into the grayscale. Furthermore, the generation unit 801 can obtain the characteristics of the above-described conversion function as an LUT (Look Up Table) in advance, and obtain gray(x, y) by LUT processing.

In S1006, the generation unit 801 uses two predetermined thresholds Th1 and Th2 (0≤Th1≤Th2), and determines whether the variable dL falls within the range of Th1 (inclusive) to Th2 (inclusive). If dL falls within this range, the process advances to S1008. If dL falls outside this range, the process advances to S1007. In S1007, the generation unit 801 increments the value of the variable Dev by 1, and advances the process to S1008. In S1008, the generation unit 801 determines whether the processes in S1002 to S1007 have been performed on all pixel positions of the print data P and the reference data R. The generation unit 801 advances the process to S1009 if YES in S1008, and returns the process to S1002 if not.

In S1009, the determination unit 802 determines whether the value of the variable Dev is 1 or more. If Dev is not 1 or more, that is, if the variable dL falls within the predetermined range (Th1 (inclusive) to Th2 (inclusive)) in all pixel positions, the process advances to S1010. If not, that is, if the variable dL falls outside the predetermined range, the process advances to S1011. In S1010, the determination unit 802 determines that no global image density difference between images is detected, and advances the process to S306. In S1011, the determination unit 802 determines that a global image density difference between images is detected, and advances the process to S306.

Note that in S306, an inspection unit 206 performs a printed product defect detection process on the difference data D in the same manner as in the first embodiment, but the difference data D in this embodiment is obtained by using only d0 as described above. In the process in S306, unlike S901, however, it is also possible to obtain difference data by using d1 and d0 like the difference data D used in the first embodiment, and use the obtained difference data.

In S902 subsequent to S309, the updating unit 803 determines whether a global image density difference is detected between the images, by referring to the result of the image density difference determination performed in S1009 to S1011. If the determination is YES, that is, if no defect is detected in S307 and a global image density difference is detected in S1011, the process advances to S903. In S903, the updating unit 803 updates the reference data stored in a reference data holding unit 203 by the print data referred to in S304. That is, the reference data is overwritten by the print data. Then, the process advances to S311. If the determination in S902 is NO, that is, if no defect is detected in S307 and no global image density difference is detected in S1010, the reference data is not updated, and the process advances to S311.

If the above process is complete, the information processing apparatus 800 returns the process from S311 to S303, and repeats the process on a next printed product. Especially when the reference data is updated in S903, the updated reference data is used in the next and subsequent processes.

Figure 11A:
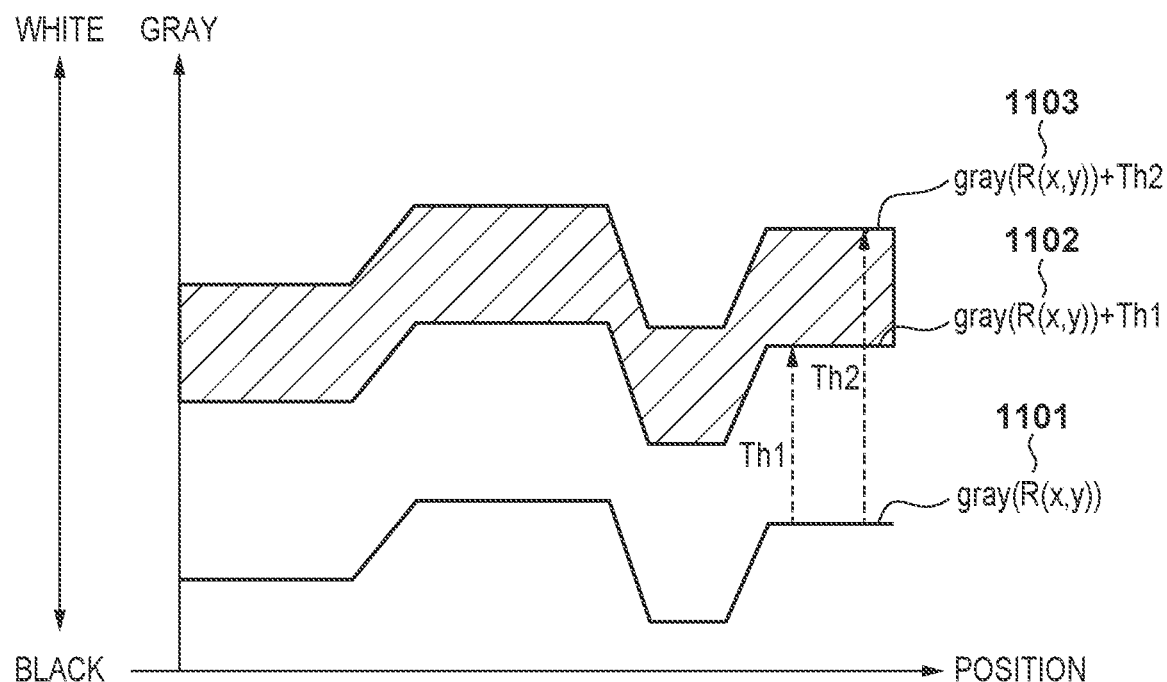
FIGS. 11A and 11B are views for explaining the determination process to be performed by the information processing apparatus according to the second embodiment.

According to the process as described above, it is possible to determine whether a global image density difference is produced between images by using the pixel value difference between the print data and the reference data and the predetermined thresholds, and correct (update) the reference data based on the determination result. The significance of this correction will be explained with reference to FIGS. 11 to 13. In FIG. 11, the abscissa represents the pixel position, and the ordinate represents the grayscaled pixel value. Also, the ordinate represents values close to white (low image density) in the upper portion, and values close to black (high image density) in the lower portion. In FIG. 11(A), a curve 1101 represents a grayscaled value gray(R(x, y)) of each pixel when given reference data R(x, y) is grayscaled. Curves 1102 and 1103 are respectively obtained by adding the thresholds Th1 and Th2 to the pixel values of the curve 1101.

Figure 11B:
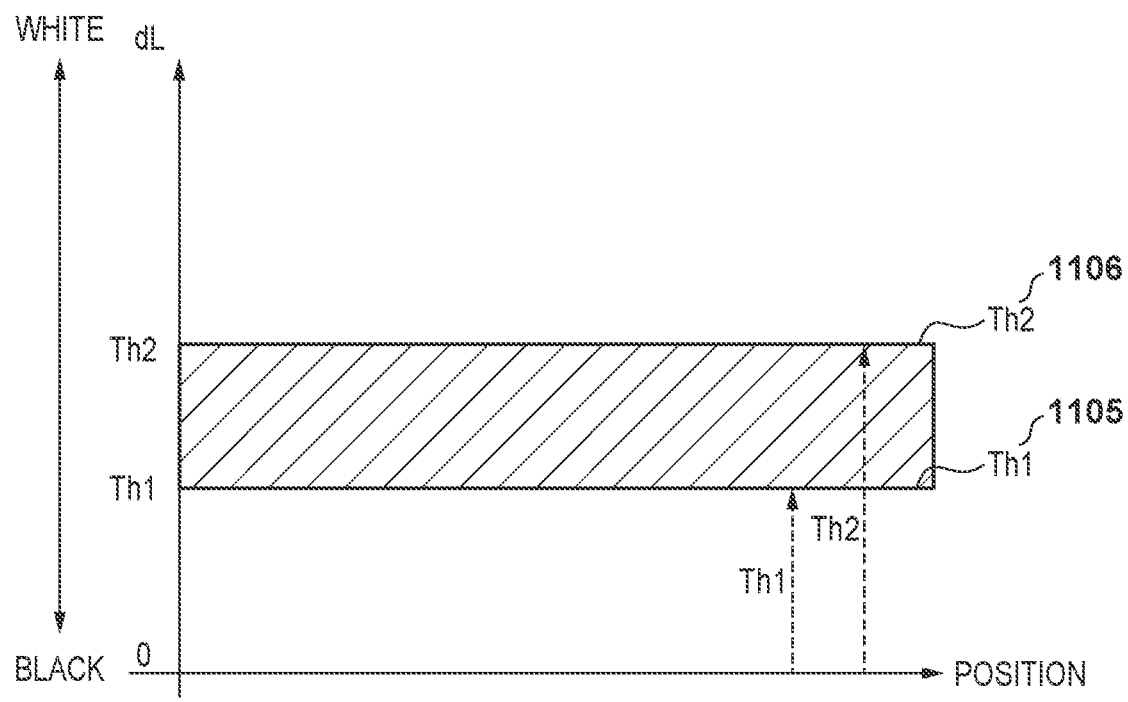

FIG. 11(B) represents the same situation as shown in FIG. 1(A) by subtracting the curve 1101 from each curve to make the curve 1101 the basis of the graph. Referring to FIG. 11(B), the curve 1101 is in a position overlapping the abscissa. Also, the curve 1102 corresponds to a curve 1105 whose value is Th1, and the curve 1103 corresponds to a curve 1106 whose value is Th2. When the reference data is updated in S902 and S903, all dL values fall within the range of Th1 (inclusive) to Th2 (inclusive) as the set of thresholds, that is, values exist (in a hatched portion) between the curves 1105 and 1106 in all pixel positions of the print data in FIG. 11.

Figure 12:
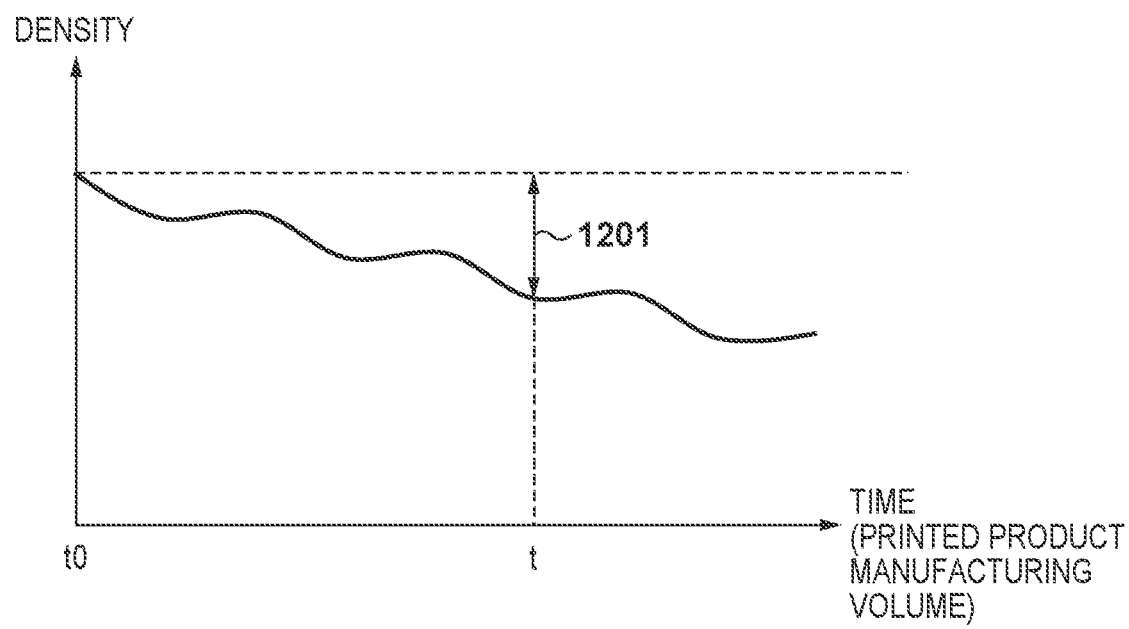
FIG. 12 is a view showing an example of a change in printing density with time of a printing apparatus according to the second embodiment.
Figure 13:
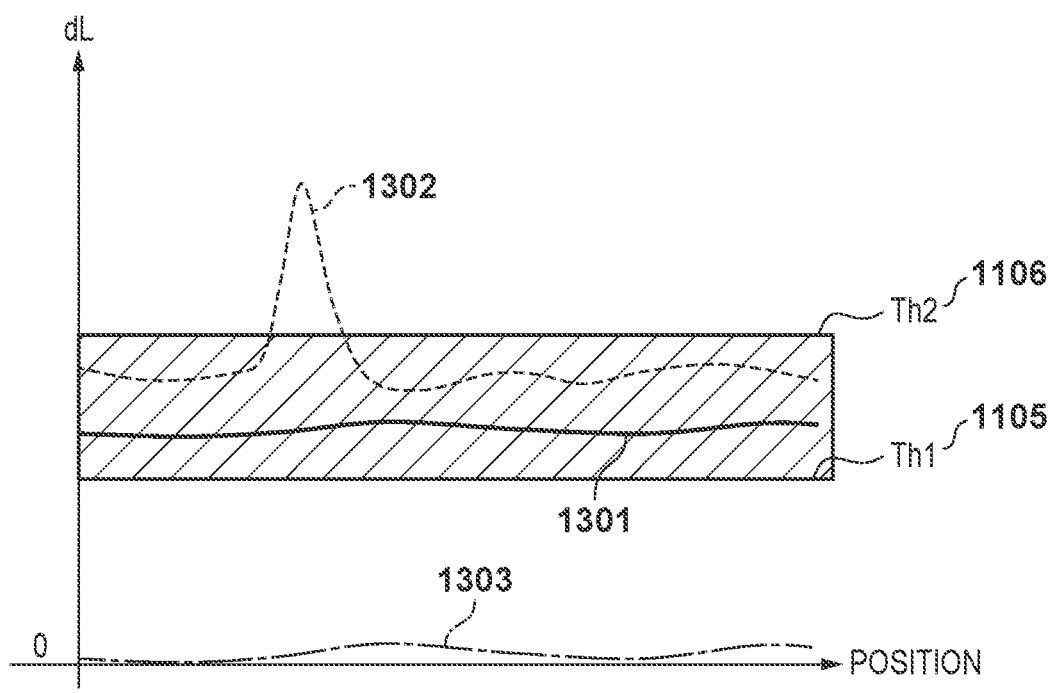
FIG. 13 is a view for explaining an updating process to be performed by the information processing apparatus according to the second embodiment.

FIG. 12 is a view representing an example of an image density variation with time of the printing apparatus, by the image density of printing as a function of the elapsed time (or the number of printed products). In this example, the reference data R is obtained at time 0, and the print data P to be inspected is obtained based on an output printed product at time t. Also, in the print data P, an image density difference at each time, which is based on the image density at time 0 (for example, a width 1201 at time t), appears on the whole image.

The information processing apparatus 800 can update the reference data when detecting an image density difference on the whole image, which is visually inconspicuous and regarded as being permissible. This visually inconspicuous and permissible image density difference on the whole image presumably satisfies, for example, conditions (A) to (C) below:

(A) The absolute value of the difference does not exceed a predetermined value in the whole area of an image (B) The positive or negative directions of the difference are constant in the whole area of an image (C) The absolute value of the difference can be regarded as being an almost constant value in the whole area of an image The condition (A) corresponds to a state in which the printed product is a qualified product. The condition (A) can be set because a large image density difference between images cannot be regarded as being visually permissible, regardless of whether the difference is a local difference or a uniform difference on the entire image. The conditions (B) and (C) correspond to a state in which an image density difference that can be regarded as being uniform is produced on the entire image. If print data is against the condition (B) or (C), a local image density difference is produced in the print data.

In addition, if reference data to be updated will remain almost unchanged before and after the update, the information processing apparatus 800 need not perform this update by assuming that the updating makes no or little difference. Corresponding to this, a condition (D) below can be added to the above-described conditions.

(D) The absolute value of the difference is equal to or larger than a predetermined value in the whole area of an image The embodiment explained with reference to FIGS. 9 and 10 is carried out by embodying the conditions (A) to (D) such that the variable dL is equal to or larger than the threshold (Th1) and equal to or smaller than the threshold (Th2) in the entire area of an image. Examples of a case in which the reference data is updated and a case in which the reference data is not updated will be explained below with reference to FIG. 13, in a form superposed on FIG. 11(B).

A solid line 1301, a broken line 1302, and an alternate long and short dashed line 1303 are curves representing the grayscaled values dL of pixel values of print data corresponding to different printed products. The solid line 1301 satisfies the conditions because it exists in the hatched portion satisfying the conditions in the entire area, so the reference data is updated in S903. This is equivalent to a case in which the printed product is a qualified product and a global image density difference is detected. The broken line 1302 partially extends outside the hatched portion, so the reference data is not updated. This is equivalent to a case in which the printed product fails the inspection. The alternate long and short dashed line 1303 is entirely dL ≒ 0 and extends outside the hatched portion, so the reference data is not updated. This is equivalent to a case in which the printed product is a qualified product but the reference data need not be updated because the image density difference is small.

This processing as described above can detect a global image density difference between images from the pixel value difference between the pixel positions of the reference data and the print data. Then, the reference data can be corrected based on this image density difference. In particular, overwriting the reference data by the print data can prevent a visually inconspicuous image density difference from being included in the difference data. This can contribute to improving the inspection accuracy and the productivity.

Note that in this case, the loop processing in S303 to S311 of FIG. 9 is successively performed. Accordingly, when a global image density difference is produced continuously with time, the global image density difference detected in S902 also increases continuously with time like the value shown in FIG. 12. In an example like this, the reference data is updated again when the value of that image density difference based on the updated reference data, increasing continuously with time, falls within a predetermined range (Th1 (inclusive) to Th2 (inclusive)) again, and the following processing is performed with the newly updated reference data.

Also note that, in the processing shown in FIG. 10, the determination method by which the variable dL is Th1 (inclusive) to Th2 (inclusive) as the set of thresholds in the entire area of an image is taken as an example of embodying the conditions (A) to (D), but the present invention is not particularly limited to this. For example, the generation unit 801 may embody the conditions (A) to (D) by using a statistical feature amount, and determine whether to update the reference data. Processing like this will be explained below with reference to FIG. 14.

Figure 14:
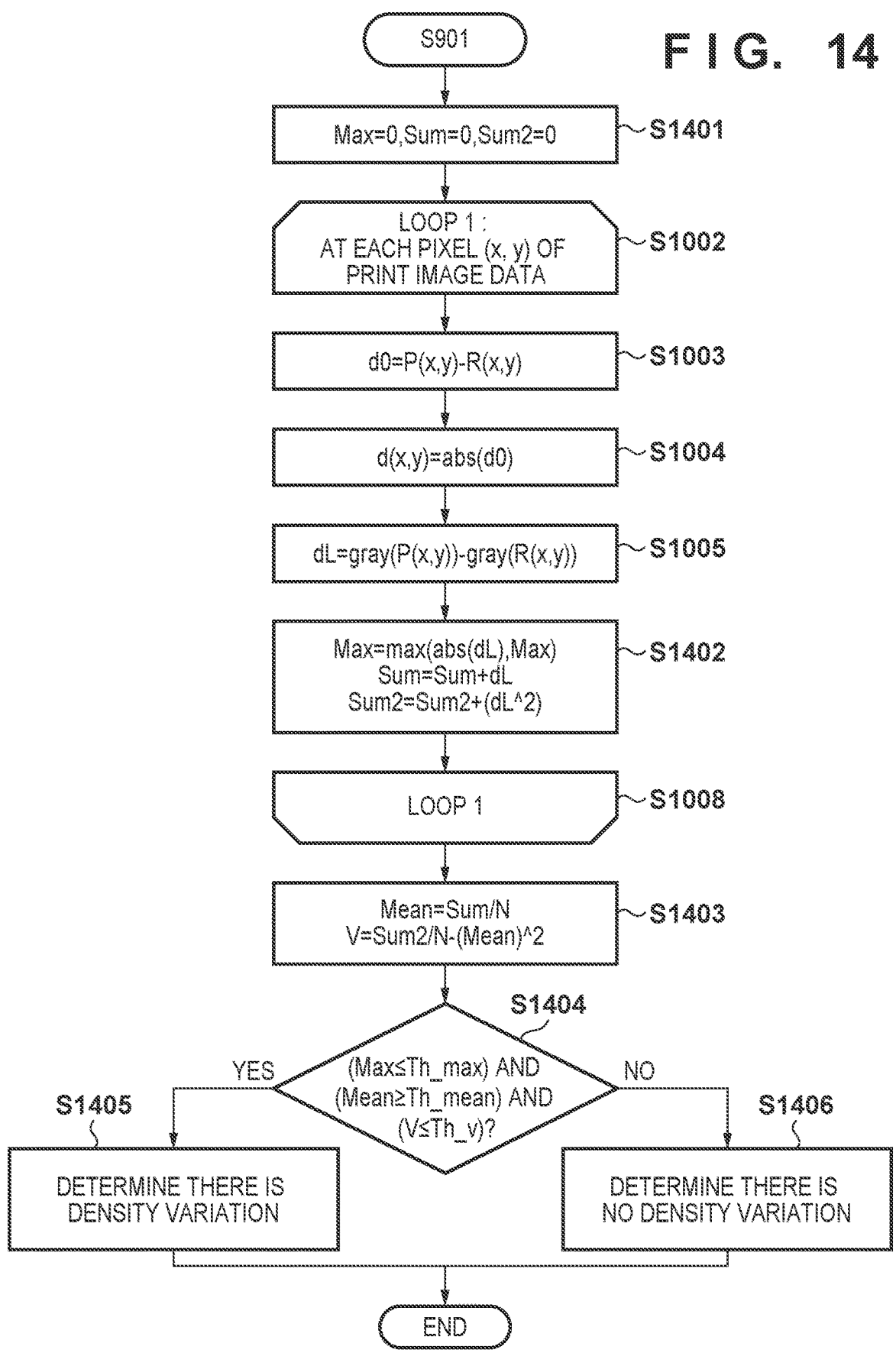
FIG. 14 is a flowchart showing an example of a different determination process according to the second embodiment.

FIG. 14 is a flowchart showing an example of the above-described determination method that uses a statistical feature amount and is performed by the information processing apparatus 800. This example shown in FIG. 14 uses three variables Max, Sum, and Sum2 instead of the variable Dev. The generation unit 801 calculates a maximum value, a sum, and a sum of squares of the absolute value of the variable dL by using Max, Sum, and Sum2. In the example shown in FIG. 14, therefore, the same process as that shown in FIG. 10 is performed except that the process performs S1401 instead of S1001, S1402 instead of S1006 and S1007, and S1403 to S1406 instead of S1009 to S1011.

In S1401, the generation unit 801 first initializes the variables Max, Sum, and Sum2 to 0, and advances the process to S1002. Also, in S1402 following S1005, the generation unit 801 substitutes, for the variable Max, a larger one of the absolute value of the variable dL and the variable Max (FIG. 14 shows this by max( )), adds the value of dL to the variable Sum, and adds the value of the square of dL to the variable Sum2. In S1403 as a step following S1008, that is, as a step next to the completion of the loop processing from S1002 to S1008 for all pixel positions, the generation unit 801 calculates a mean value Mean of dL by dividing the variable Sum by a pixel value N. In addition, the generation unit 801 calculates a variance value V of dL from Sum2 and Mean.

The loop processing from S1002 to S1008 can be performed on individual pixel positions in order or in parallel. When performing the processing in parallel, the generation unit 801 sets the maximum value of dL calculated for the unit of the parallel processing as Max, the sum of dL as Sum, and the sum of squares of dL as Sum2. Furthermore, when the pixel number N is a constant, the dividing process using N may also be omitted from the Mean and V calculation process.

In S1404, the determination unit 802 respectively compares the calculated Max, Mean, and V with predetermined thresholds Th_Max, Th_Mean, and Th_V. If it is determined that Max is equal to or smaller than Th_Max, Mean is equal to or larger than Th_Mean, and V is equal to or smaller than Th_V, the determination unit 802 advances the process to S1405, and determines that a global image density difference is produced. If at least one of these conditions is not satisfied, the determination unit 802 advances the process to S1406, and determines that no global image density difference is produced.

When collating this determination performed in S1404 with the above-described conditions (A) to (D), a case in which it is determined that the maximum value Max is smaller than Th_Max corresponds to the condition (A). A case in which it is determined that the mean value Mean is larger than Th_Mean corresponds to the condition (D), and it also corresponds to the condition (B) because the mean value tends to decrease if the image density difference moves between positive and negative. A case in which V is smaller than Th_V corresponds to the conditions (B) and (C). The processing like this can detect a global image density difference between images by using the image density difference distribution in each pixel position and statistical feature amounts, and update the reference data.

As explained with reference to, for example, FIG. 11 and FIG. 12, the generation unit 801 according to this embodiment detects an image density variation in the direction in which the image density decreases, but the present invention is not particularly limited to this. For example, the generation unit 801 can detect an image density variation in the direction in which the image density increases, and can also detect an image density variation in both the image density directions: increase and decrease. To detect an image density variation in the direction in which the image density increases, the generation unit 801 can set thresholds like Th1 and Th2 and a determination mechanism in the direction in which the image density increases as well, and perform the determination process as shown in FIG. 10.

The information processing apparatus 800 according to this embodiment can also add a condition (E) in which an image density variation is detected in the same direction, increase or decrease, continuously along the time axis, to the conditions to be used to update the reference data. That is, the reference data can be updated when a long period variation ingredient of an image density variation is detected. The long period variation ingredient represents an image density variation ingredient having the same sign, which is continuously detected for a predetermined period or more. The condition (E) will be explained below with reference to FIG. 15.

Figure 15:
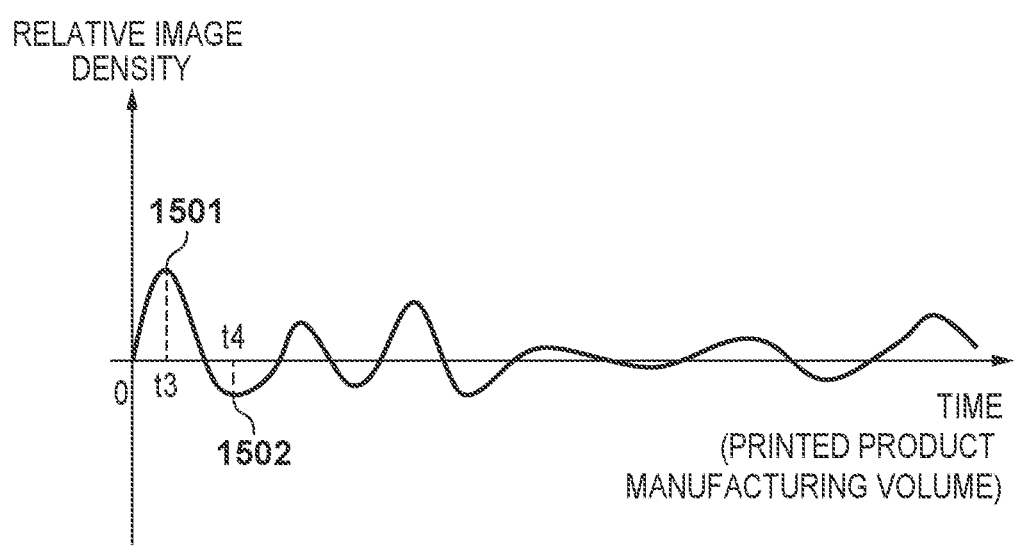
FIG. 15 is a view for explaining a long period image density variation according to the second embodiment.

FIG. 15 is a view representing an example of an image density variation in the printing apparatus in which no long period image density variation occurs. Referring to FIG. 15, the abscissa represents the time (or the number of printed products), the ordinate represents the relative image density of print data, and the image density of the printed product at time 0 is used as the reference of the relative image density. In this diagram, we assume the reference data update determination condition in the second embodiment is satisfied at time t3, and the print data is darker than the reference data in this case, so the image density becomes higher when the reference data is updated. Reference numeral 1501 represents the amount of image density variation in this case. Also, assume the reference data update determination condition is satisfied at time t4 immediately after time t3, and the print data is lighter than the reference data in this case, so the image density becomes lower when the reference data is updated. In this case, a phenomenon in which the reference data is updated to the image density in the opposite direction within a short time period and the reference becomes unstable occurs. It should be noted that when the process is performed at time t3, a future image density variation is unknown.

By taking account of the phenomenon as described above, the information processing apparatus 800 may also detect only a long period change in image density variation, in order not to update the reference data by excessively catching an image density variation that occurs within a short time or accidentally. That is, for example, the information processing apparatus 800 can update the reference data only when an image density variation is temporally continuously detected in the same direction. Therefore, as the condition that is used in S902 in order to advance the process to S903, a condition that an image density variation is detected and an image density variation in the same direction is continuously detected a predetermined number of times is added. The updating unit 803 may also store the log of information on the detected image density variation in the managing unit 207 and refer to the log. The processing like this can improve the accuracy or stability of detection of the image density variation as a target, and prevent inappropriate reference data update.

The updating unit 803 according to this embodiment updates the reference data by overwriting it by the print data, but the reference data updating method is not particularly limited to this. The updating unit 803 can update the reference data by an arithmetic operation based on the difference between pixel values in corresponding pixel positions of the reference data and the print data. For example, the updating unit 803 can set the mean of pixel values in corresponding pixel positions of the reference data and the print data as the pixel value of the updated reference data. The updating unit 803 can also update the reference data by performing weighted addition on pixel values in corresponding pixel positions of the reference data and the print data. Furthermore, the updating unit 803 can update the reference data by adding a value to the pixel value of the reference data or multiplying the pixel value of the reference data by a value, based on the detected image density difference between images. The processing like this can reduce the magnitude of a change when the reference data is updated.

The thresholds Th1 and Th2 to be used to detect a global image density difference can be constant regardless of the image density of the pixel value of the reference data, and can also change for each pixel value in accordance with the characteristic (a so-called image density characteristic gamma) of the image density variation of the printing apparatus. That is, in FIG. 11A, Th1 and Th2 can change in accordance with the height (pixel value) of the curve 1101, and the position and height of the hatched portion and the shapes of the curves 1102 and 1103 can also change.

Example of Performing User Notification

This specification has disclosed examples of the information processing apparatus capable of performing an inspection process, while adaptively inserting an adjusting process, on a permissible image density variation that occurs with time in the printing apparatus. On the other hand, if an image density variation is large, the variation visually has large influence, so the printed product is not admitted as a qualified product. In addition, there is the possibility that abnormality has occurred in printing output or image density adjustment, so similar printed products may be output continuously or frequently. If the operation is continued in this state, the productivity decreases, so it is desirable to quickly encourage the user to perform confirmation. From this viewpoint, if the detected image density variation is larger than a predetermined variation, the information processing apparatus can present this state to the user, and encourage the user to determine whether to perform calibration or continue outputting. In addition, when encouraging this user determination, the information processing apparatus can temporarily stop the inspection process currently being performed.

Figure 16:
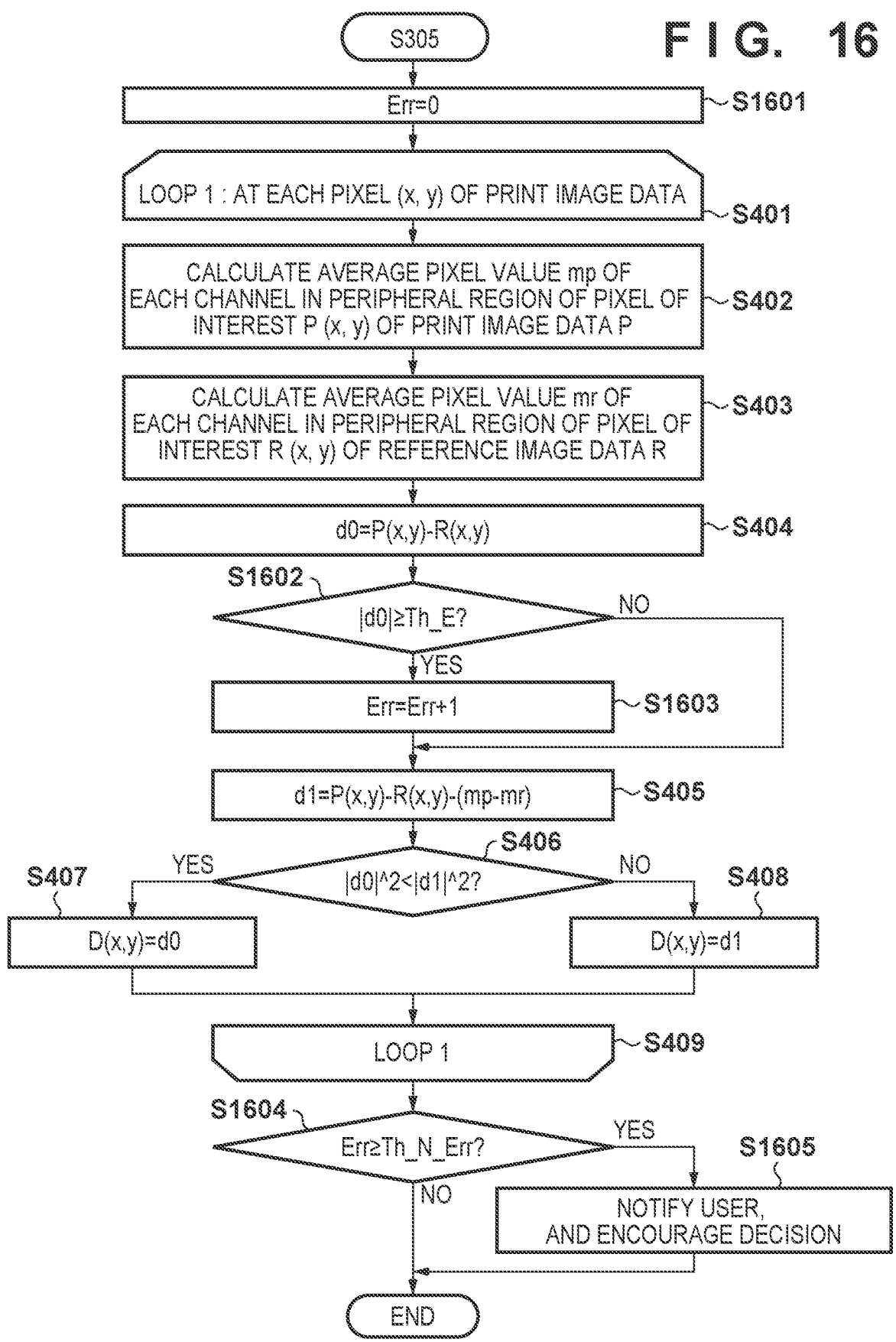
FIG. 16 is a flowchart showing an example of a notification process of the information processing apparatus according to the first embodiment.

The above-described user determination encouraging process to be performed by the information processing apparatus 100 according to the first embodiment will be explained below with reference to FIG. 16. In this processing example shown in FIG. 16, the same processing as shown in FIG. 4 is performed except that S1601 to S1605 are added, so a repetitive explanation will be omitted. In S1601 following S304, the generation unit 205 initializes a variable Err to 0, and advances the process to S401. The variable Err is a variable for counting pixels having large differences between the reference data and the print data, and storing the count. In S1602 following S404, the generation unit 205 determines whether the absolute value of d0 calculated in S404 is equal to or smaller than a predetermined threshold Th_E. Th_E is a threshold representing a large pixel value suggesting abnormality of the printing apparatus, and can suitably be set to a desired value. If the absolute value of d0 is equal to or larger than the threshold Th_E, the process advances to S1603. If not, the process advances to S405. In S1603, the generation unit 205 increments the variable Err by 1, and advances the process to S405. In the processing performed in S1602, mp and mr may also be used instead of d0.

In S1604 following the loop processing in S401 to S409, the generation unit 205 compares the value of the variable Err with a predetermined threshold Th_N_Err. The threshold Th_N_Err is a threshold set for the number of pixels found to have large differences between the reference data and the print data. If the variable Err is equal to or larger than the threshold Th_N_Err, it is determined that a large image density variation suggesting abnormality of the printing apparatus has occurred in the whole image. On the other hand, if the variable Err is smaller than the threshold Th_N_Err, it is determined that even when the variable Err is counted, that is due to a local image density variation, that is, due to a defect other than a global image density difference. If it is determined that the variable Err is equal to or larger than the threshold Th_N_Err, the process advances to S1605. If not, the generation unit 205 terminates the process. In S1605, the generation unit 205 notifies the user of the possibility of abnormality of the printing apparatus via the UI panel 108, and encourages the user to determine, for example, whether to check the printing apparatus. When performing this notification, the information processing apparatus 100 can temporarily stop the processing of the printing apparatus. Also, the condition by which the generation unit 205 encourages the user to make a decision is not limited to that in S1604. For example, it is possible to add a condition that an image density variation is detected in only the same direction, or a condition that an image density variation is temporally continuously detected. The threshold Th_N_Err is not particularly limited, and can be given as a desired value in accordance with the condition. The processing like this can also be performed by the information processing apparatus 800 according to the second embodiment, instead of the information processing apparatus 100. In this processing, when an image density variation falls within a predetermined range (for example, within Th_E), it can be determined that the printed product is a good product by taking account of d1 even if the image density variation has occurred. On the other hand, if the image density variation exceeds the predetermined range, the user is notified of this information.

In the processing like this, if a large image density difference is detected, the user is quickly encouraged to give his or her confirmation. This can improve the productivity as a whole by, for example, suppressing the generation of disqualified products.

[Log]

When an event such as detection of the image density difference, update of the reference data, or notification to the user has occurred, the managing unit 207 can also store the occurrence time of the event, a generated job, and data as the basis of the occurrence of the event. In this case, the managing unit 207 can output these pieces of information to the user as needed. The data like this can be used in, for example, confirmation of the printed deliverable, verification of the inspection result, or the maintenance of the printing apparatus.

[User Mode]

A case in which a visually inconspicuous image density difference is permitted by taking account of the balance with the productivity as has been described above is possible, but this case is not always possible, and a case in which it is desirable to strictly manage deliverables by giving priority to the quality is also possible. From this viewpoint, the above-described embodiment can be implemented as one mode, and whether to use the mode of the above-described embodiment can be determined in accordance with a use case.

[Condition of Color]

The information processing apparatus 800 according to the second embodiment detects a global image density difference by grayscaling the print data and the reference data. In this case, while the grayscaled image density difference is easily permitted, stricter management is sometimes required for the variations of colors such as the color of the skin of a person and food. From this point of view, the information processing apparatus 800 can add color variation conditions in order to detect the image density variation or update the reference data. For example, the information processing apparatus 800 can detect the image density variation or update the reference data when pixel values r:g:b of the R, G, and B channels of the print data fall within a predetermined range with respect to the ratio of r:g:b of the reference data. As another example, the information processing apparatus 800 can detect the image density variation or update the reference data when the color space of the print data and the reference data is converted into a color-system color space (for example, CIE L*a*b*), and the color variation after the conversion falls within a predetermined range.

In the first and second embodiments, an image density variation is detected from the pixel value of the print data generated by the reading device 105. Therefore, the image density variation detection process can be performed by including the process in the printed product defect detection process, and this obviates the need for a device for image density variation detection only. However, the present invention is not limited to this, and the information processing apparatus may also include another means such as an image density sensor, and detect an image density variation by measuring the image density of the printed product by using the image density sensor. In addition, the reading device 105 can obtain image data by using an image capturing device, instead of obtaining image data by a system such as a scanner. Furthermore, the present invention is not limited to the contents directly explained above, and may also be implemented by combining the elements and the concepts explained in each embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-030845, filed Feb. 26, 2020, which is hereby incorporated by reference herein in its entirety.

What is claimed is:

1. An information processing apparatus comprising:
a first obtaining unit configured to obtain data of a reference image indicating a target of printing output to be performed by a printing apparatus;
a second obtaining unit configured to obtain data of a printed image by reading an image printed by the printing apparatus;
a generating unit configured to generate difference data by using one of a first image density difference between a pixel in a position of a pixel of interest in the reference image and a pixel in the position of a pixel of interest in the printed image, and a third image density difference obtained by subtracting, from the first image density difference, a second image density difference between a region containing a pixel in the position of a pixel of interest in the reference image and a region containing a pixel in the position of a pixel of interest in the printed image, as a difference corresponding to a pixel in the position of a pixel of interest; and
an evaluating unit configured to evaluate quality of the printed image based on the difference data.

2. An information processing method comprising:
obtaining data of a reference image indicating a target of printing output to be performed by a printing apparatus;
obtaining data of a printed image by reading an image printed by the printing apparatus;
generating difference data by using one of a first image density difference between a pixel in a position of a pixel of interest in the reference image and a pixel in the position of a pixel of interest in the printed image, and a third image density difference obtained by subtracting, from the first image density difference, a second image density difference between a region containing a pixel in the position of a pixel of interest in the reference image and a region containing a pixel in the position of a pixel of interest in the printed image, as a difference corresponding to a pixel in the position of a pixel of interest; and
evaluating quality of the printed image based on the difference data.

* * * * *